United States Patent [19]

Tokieda et al.

[11] Patent Number: 5,356,441
[45] Date of Patent: Oct. 18, 1994

[54] REACTIVE DYE COMPOSITION AND METHOD FOR DYEING OR PRINTING FIBER MATERIALS USING THE SAME

[75] Inventors: Takemi Tokieda, Nara; Naoki Harada, Ibaraki; Shuhei Hashizume, Osaka; Koiti Ishii; Nobuaki Kawamura, both of Toyonaka; Tetsuya Miyamoto, Nara; Hiroyuki Suzuki, Habikino; Shigeru Kawabata, Ibaraki, all of Japan

[73] Assignee: Sumitomo Chemical Company, Limited, Osaka, Japan

[21] Appl. No.: 118,227

[22] Filed: Sep. 9, 1993

[30] Foreign Application Priority Data

| Sep. 11, 1992 | [JP] | Japan | 4-243171 |
| Sep. 29, 1992 | [JP] | Japan | 4-259932 |
| Sep. 29, 1992 | [JP] | Japan | 4-259933 |
| Oct. 1, 1992  | [JP] | Japan | 4-263578 |
| Apr. 8, 1993  | [JP] | Japan | 5-081813 |
| Apr. 8, 1993  | [JP] | Japan | 5-081814 |

[51] Int. Cl.$^5$ .................. C09B 62/016; D06P 1/38
[52] U.S. Cl. .................. 8/543; 8/549; 8/547; 8/661
[58] Field of Search .................. 8/543, 549, 547, 661

[56] References Cited

U.S. PATENT DOCUMENTS

| 3,770,371 | 11/1973 | Bossard et al. | 8/89 |
| 3,989,692 | 11/1976 | Jager et al. | 8/549 X |
| 4,280,956 | 7/1981 | Schreiner et al. | 540/125 |
| 5,270,454 | 12/1993 | Hoppe et al. | 534/634 |

FOREIGN PATENT DOCUMENTS

| 0024654 | 3/1981 | European Pat. Off. . |
| 0087703 | 9/1983 | European Pat. Off. . |
| 2403859 | 8/1975 | Fed. Rep. of Germany . |
| 1555965 | 1/1969 | France . |
| 490468 | 5/1970 | Switzerland . |
| 1164587 | 9/1969 | United Kingdom . |

*Primary Examiner*—Arthur C. Prescott
*Attorney, Agent, or Firm*—Stevens, Davis, Miller & Mosher

[57] ABSTRACT

A reactive dye composition containing a reactive dye and a salt of polyoxyethylene substituted-phenyl ether ester produces excellent solubility in water and in an aqueous alkali solution and can be used to dye a fiber material uniformly.

21 Claims, No Drawings

REACTIVE DYE COMPOSITION AND METHOD FOR DYEING OR PRINTING FIBER MATERIALS USING THE SAME

The present invention relates to a reactive dye composition excellent in solubility in water and in an aqueous alkali solution, and to a method for uniformly dyeing or printing fiber materials, particularly cellulose fiber materials or fiber materials containing cellulose fiber, using the reactive dye composition.

Reactive dyes have largely been used hitherto for dyeing and printing cellulose fiber and the like. As a method for dyeing or printing those fibers, various dyeing methods such as exhaustion dyeing method, one-bath padding method, cold batch up method, one phase printing method and the like are adopted. For obtaining a spotless and uniform dyed or printed product by these methods, a reactive dye of sufficient solubility is selected in the preparation of dye solution, padding solution or printing color paste. Thus, in the cold batch up dyeing method, it is desirable to prepare a padding solution from a reactive dye which can dissolve in an amount of 100 parts by weight or more in 1,000 parts by weight of an aqueous solution containing an alkali such as sodium hydroxide, sodium carbonate, sodium tertiary phosphate, sodium silicate or the like and can maintain a stable solution for a long period of time without deposition of dye. In the exhaustion dyeing method, it is desirable to prepare a dye solution from a reactive dye having a sufficiently high solubility in an aqueous solution containing an inorganic salt such as sodium sulfate, sodium chloride and the like and the above-mentioned alkali in large amounts. From this viewpoint, a method for improving solubility has been proposed in JP-A-63-26788, etc.

However, in dyeing or printing a fiber material with commercial reactive dyes, a there arises a problem that those commercial reactive dyes are yet unsatisfactory in the solubility in an aqueous alkali solution and the solutions prepared therefrom are insufficient in stability. Thus, development of a dye excellent in solubility and in stability of the solution which they give is intensely desired.

The present inventors have conducted extensive studies with the aim of obtaining a reactive dye composition excellent in solubility in water and aqueous alkali solution, giving a stable dye solution free from deposition of dye, and capable of giving a uniform and deep-colored dyed or printed product when used for dyeing or printing. As a result, the present invention has been accomplished.

The present invention provides a reactive dye composition comprising a reactive dye and a salt of polyoxyethylene substituted-phenyl ether ester, and a method for dyeing or printing a cellulose fiber material or a cellulose fiber-containing fiber material by the use of this reactive dye composition.

In preparing the reactive dye composition of the present invention, one or more dyes selected from known reactive dyes are used. Of these reactive dyes, preferred are those having at least one reactive group selected from a vinylsulfone type reactive group, a triazine type reactive group and a pyrimidine type reactive group; the vinylsulfone type reactive group being represented by the formula $-SO_2L_1$ in which $L_1$ is $-CH=CH_2$ or $-CH_2CH_2L_2$ in which $L_2$ is a group capable of being split by the action of an alkali, the triazine type reactive group consisting of monochlorotriazinyl, monofluorotriazinyl, mononicotiniotriazinyl and dichlorotriazinyl, and the pyrimidine type reactive group consisting of difluoromonochloropyrimidinyl and trichloropyrimidinyl.

In the present invention, reactive dyes represented by the following formulas. (I) to (VIII) are most preferably used:

Phthalocyanine reactive dyes represented by the formula (I) in the free acid form:

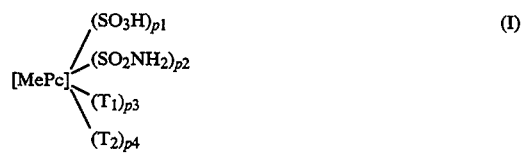

wherein [MePc] is a metal phthalocyanine; $p_1$, $p_2$, $p_3$ and $p_4$ represent a number of 1 to 3, 0 to 2, 1 to 3 and 0 to 2, respectively, provided that $p_1+p_2+p_3+p_4 \leq 4$; $T_1$ and $T_2$ are different from one another, $T_1$ is a group having any one reactive group selected from the above-mentioned vinylsulfone type, triazine type, and pyrimidine type reactive groups and $T_2$ is a group having any one reactive group selected from the above-mentioned vinyl-sulfone type and pyrimidine type reactive groups;

Monoazo reactive dyes represented by the following formula (II) in the free acid form:

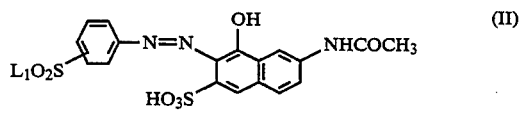

wherein $L_1$ is as defined above;

Anthraquinone reactive dyes of which dye matrix is represented by the formula (III) in the free acid form:

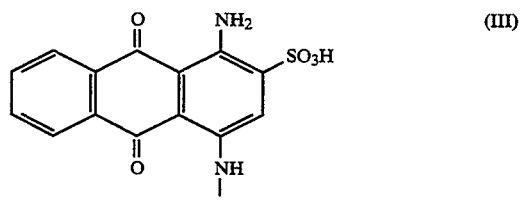

and more specifically, anthraquinone dyes represented by the formula (IV) in the free acid form:

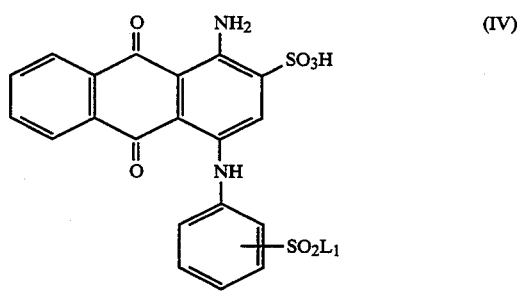

wherein $L_1$ is as defined above;

Formazan reactive dyes represented by the following formula (V) in the free acid form:

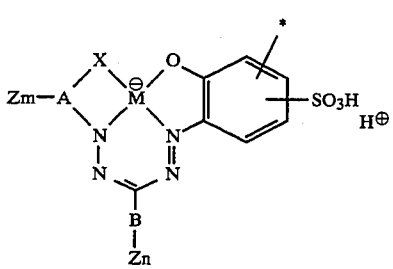

(V)

wherein A is an unsubstituted or substituted phenylene or naphthylene residue; B is a straight chain or branched chain alkyl or alkenyl group, a phenyl group, a naphthyl group or a heterocyclic group, in which the said alkyl, alkenyl, phenyl, naphthyl and heterocyclic groups are unsubstituted or substituted; M is a metallic ion having an atomic number of 27 to 29; X is —O— or —COO—; Z is a water-solubility imparting group; m and n independently represent an integer of 0 to 3, provided that m+n=1 to 3; and the asterisked bond is linked to any one of the above-mentioned vinylsulfone type reactive groups, triazine type reactive groups or pyrimidine type reactive groups, or alternatively, the bond is linked to a substituent having any one of those reactive groups;

Dioxazine reactive dyes represented by the formula (VI) in the free acid form:

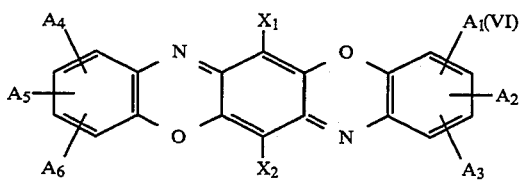

(VI)

wherein $X_1$ and $X_2$ are independently hydrogen or halogen; and at least one of $A_1$, $A_2$, $A_3$, $A_4$, $A_5$ and $A_6$ represents a bond linking to any one of the above-mentioned vinyl-sulfone type reactive groups, triazine type reactive groups or pyrimidine type reactive groups, or alternatively, a bond linking to a substituent having any one of those reactive groups, and the remaining ones are independently hydrogen, lower alkyl, lower alkoxy, sulfo or amino;

Reactive dyes represented by the formulas (VII) and (VIII) in the free acid form:

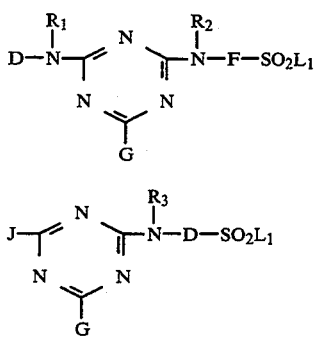

wherein $R_1$, $R_2$ and $R_3$ are independently hydrogen or an unsubstituted or substituted alkyl group; D is a sulfo-bearing organic dye residue; F is an unsubstituted or substituted phenylene or naphthylene group; G and J are independently halogen, an unsubstituted or substituted pyridinio group, —N(R$_4$)R$_5$, —OR$_6$ or —SR$_7$ in which $R_4$, $R_5$, $R_6$ and $R_7$ are independently hydrogen or an unsubstituted or substituted alkyl, phenyl, naphthyl or benzyl group; and $L_1$ is as defined above.

The reactive dyes represented by the formula (I) are disclosed in, for example, JP-B-38-5033. However, the dyes usable for the present invention are not limited to these reactive dyes. In formula (I), the metal Me is not particularly limited. However, copper, iron, nickel and cobalt are preferable, and copper and nickel are particularly preferable.

As the reactive group represented by $T_1$ and $T_2$, sulfatoethylsulfonyl, vinylsulfonyl, monochlorotriazinyl, dichlorotriazinyl and difluoromonochloropyrimidinyl are particularly preferable.

The reactive dyes represented by the formula (II) are known compounds, of which examples are C. I. Reactive Orange 7, C. I. Reactive Orange 16, and the like.

Specific examples of the reactive dyes represented by the formula (IV) are C. I. Reactive Blue 19, and the like.

The reactive dyes represented by the formula (V) are disclosed in, for example, JP-A-60-40166, etc. However, the dyes usable for the present invention are not limited to those compounds.

The dyes represented by the formula (VI) are disclosed in, for example, JP-A-60-184567, etc. However, the dyes usable for the present invention are not limited to those compounds.

In formula (VI), $X_1$ and $X_2$ are independently hydrogen or halogen such as fluorine, chlorine bromine, or iodine. Of these, hydrogen and chlorine are particularly preferred.

In the formula (VI), at least one of $A_1$, $A_2$, $A_3$, $A_4$, $A_5$ and $A_6$ represents a bond linking to any one of the above reactive groups or linking to a substituent having any one of those reactive groups and the remaining ones are independently hydrogen, $C_1$-$C_4$ alkyl, $C_1$-$C_4$ alkoxy, sulfo or unsubstituted or substituted amino; and particularly preferably the remaining ones are independently hydrogen or sulfo, methyl, ethyl, methoxy, ethoxy, amino or substituted amino or the like.

In the formulas (VII) and (VIII), the lower alkyl represented by $R_1$, $R_2$ and $R_3$ is preferably alkyl having 1 to 4 carbon atoms; and as the substituents which the lower alkyl may have, hydroxy, cyano, alkoxy, halo, carboxy, carbamoyl, alkoxycarbonyl, alkylcarbonyloxy, sulfo and sulfamoyl are preferable.

Specific examples of $R_1$, $R_2$ and $R_3$, which may be the same or different, are hydrogen, methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxyethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl,2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl, etc. Of these, hydrogen, methyl and ethyl are particularly preferable.

As the phenylene and naphthylene represented by F, preferred are phenylene unsubstituted or substituted once or twice by methyl, ethyl, methoxy, ethoxy, chlorine, bromine or sulfo, and sulfo-substituted naphthylene. Some examples are enumerated as follows:

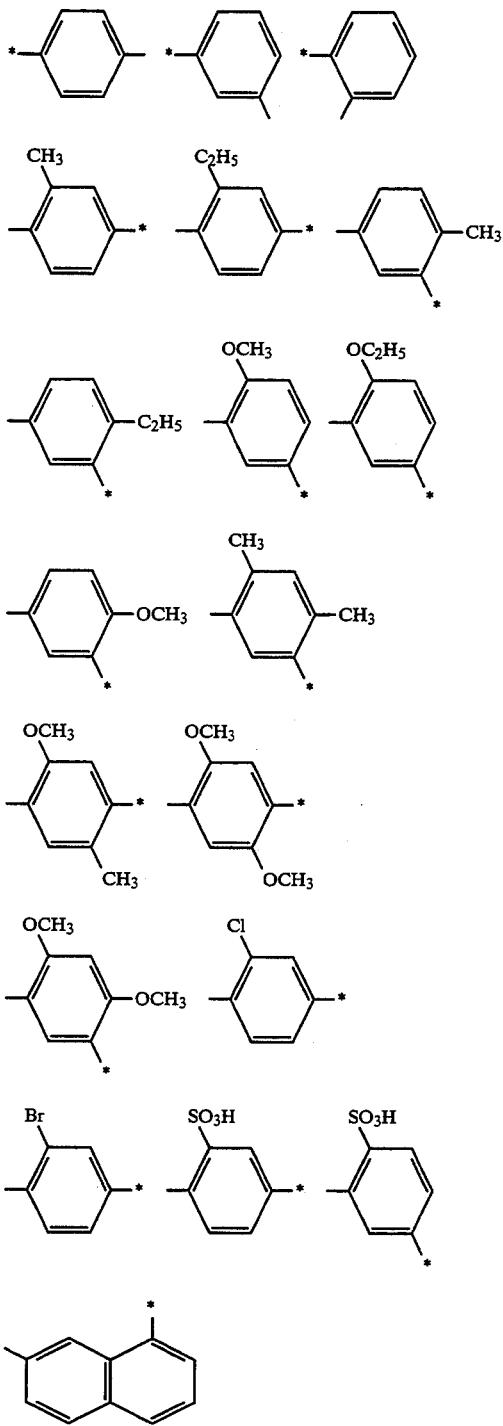

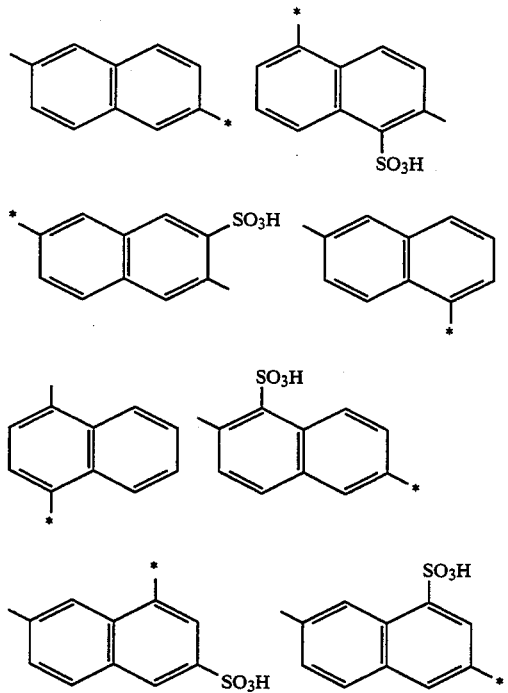

wherein the asterisk denotes a bond linking to —$SO_2L_1$, or the like.

The sulfo-bearing organic dye residue represented by D is not particularly limited, and includes, for example, residues of dyes belonging to mono- and poly-azo dyes, formazan dyes, anthraquinone dyes, phthalocyanine dyes, stilbene dyes, oxazine dyes, dioxazine dyes, triphenylmethane dyes, nitro dyes and azomethine dyes. Of these dyes, those belonging to mono- and poly-azo dyes, formazan dyes and phthalocyanine dyes may form a metal complex. As a central metal of the metal complex, Cu, Cr, Co, Ni, Fe and the like are preferred.

The alkyl group for $R_4$, $R_5$, $R_6$ and $R_7$ is preferably $C_1$–$C_4$ alkyl unsubstituted or substituted once or twice by alkoxy, sulfo, carboxy, hydroxy, chloro, phenyl or sulfato. Of these, particularly preferable are methyl, ethyl, n-propyl, isopropyl, n-butyl, isobutyl, sec-butyl, β-hydroxyethyl, β-sulfatoethyl, β-sulfoethyl, β-methoxyethyl, β-carboxyethyl and the like.

The unsubstituted or substituted phenyl group for $R_4$, $R_5$, $R_6$ and $R_7$ is preferably one unsubstituted or substituted once or twice by $C_1$–$C_4$ alkyl, $C_1$–$C_4$ alkoxy, sulfo, carboxy, chloro or bromo. Of these, particularly preferable are 2-, 3- or 4-sulfophenyl; 2,4- or 2,5-disulfophenyl; 2-, 3- or 4-carboxyphenyl; phenyl; and the like.

The unsubstituted or substituted naphthyl group for $R_4$, $R_5$, $R_6$ and $R_7$ is preferably one unsubstituted or substituted once, twice or thrice by hydroxy, carboxy, sulfo, $C_1$–$C_4$ alkyl, $C_1$–$C_4$ alkoxy or chloro. Of these, particularly preferable are 2-, 3-, 4-, 5-, 6-, 7- or 8-sulfo-2-naphthyl; 1,5-, 5,7-, 6,8-, 4,8-, 4,7-, 3,8-, 4,6-, 3,7-or 3,6-disulfo-2-naphthyl; 4,6,8-, 2,4,7- or 3,6,8-trisulfo-1-naphthyl; 1,5,7-, 4,6,8- or 3,6,8-trisulfo-2-naphthyl; and the like.

The unsubstituted or substituted benzyl group for $R_4$, $R_5$, $R_6$ and $R_7$ is preferably one unsubstituted or substituted once or twice by $C_1$–$C_4$ alkyl, $C_1$–$C_4$ alkoxy, sulfo or chloro. Of these, particularly preferable are benzyl; 2-, 3- or 4-sulfobenzyl; and the like.

The halogen atom for G and J is preferably chlorine or fluorine. The pyridinio group for G and J is preferably one unsubstituted or substituted by carboxy or carbamoyl.

When G and J are the group —N(R$_4$)R$_5$, specific examples of compounds having the formula HN(R$_4$)R$_5$ capable of forming the group —N(R$_4$)R$_5$ are as follows:
ammonia;
aromatic amines such as 1-aminobenzene, 1-amino-2-, -3- or -4-methylbenzene, 1-amino-3,4- or -3,5-dimethylbenzene, 1-amino- 2-, -3- or -4-ethylbenzene, 1-amino-2-, -3- or -4-methoxybenzene, 1-amino-2-, -3- or -4-ethoxybenzene, 1-amino- 2-, -3- or 4-chlorobenzene, 3- or 4-aminophenylmethanesulfonic acid, 2-aminobenzenesulfonic acid, 3-aminobenzenesulfonic acid, 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,4-disulfonic acid, 6-aminobenzene-1,3-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4-methylbenzene, 1-(2-hydroxyethyl)-amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene- 2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid; and aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamic acid, aminoacetic acid, methylaminoacetic acid, ε-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine and 1-phenyl- 2-propylamine.

Of these, particularly preferable are aniline, N-methylaniline, N-ethylaniline, 2-, 3- or 4-aminobenzenesulfonic acid, 3- or 4-methylaminobenzenesulfonic acid, 3- or 4-ethylaminobenzenesulfonic acid, 6-aminobenzene-1,3- or -1,4-disulfonic acid, 2-, 3- or 4-aminobenzoic acid, taurine, N-methyltaurine, mono- or diethanolamine and the like.

When G and J are the group —OR$_6$, specific examples of compounds having the formula R$_6$OH capable of forming the group —OR$_6$ are those having the same structures as above except that the amino group is replaced by hydroxy group.

When G and J are the group —SR$_7$, specific examples of compounds having the formula R$_7$SH capable of forming the group —SR$_7$ are thiol compounds having the same structures as above except that the amino group is replaced by a mercapto group.

The compounds represented by the formulas (VII) and (VIII) can be produced according to a known method.

For example, a reactive dye represented by the formula (VII) can be produced by a successive condensation reaction of an organic dye represented by the following formula (IX):

wherein D and R$_1$ are as defined above, an amine represented by the formula (X):

wherein R$_2$F and L$_1$ are as defined above, and, as an optional component, an unsubstituted or substituted pyridine with 2,4,6-trihalogeno-1,3,5-triazine in an arbitrary order.

On the other hand, a reactive dye represented by the formula (VIII) can be produced by a successive condensation of an organic dye represented by the formula (XI):

wherein R$_3$, D and L$_1$ are as defined above, a compound represented by one of the formulas (XII), (XIII) and (XIV):

wherein R$_4$, R$_5$, R$_6$ and R$_7$ are as defined above, and, as an optional component, an unsubstituted or substituted pyridine with 2,4,6-trihalogeno-1,3,5-triazine in an arbitrary order.

In the reactive dye used in the invention, specific examples of the group represented by $L_2$ capable of being split by the action of an alkali are sulfuric ester group, thiosulfuric ester group, phosphoric ester group, acetic ester group, halogen atom and the like. However, these examples are by no means limitative upon the invention.

The reactive dyes used in the invention are in the free acid form or in the form of a salt thereof. Preferable salts are alkali metal salts and alkaline earth metal salts, and particularly preferable ones are sodium salt, potassium salt and lithium salt.

The salt of polyoxyethylene substituted-phenyl ether ester used in the production of the reactive dye composition of the invention is well known in itself as an anionic surfactant.

Specific examples of the salts of polyoxyethylene substituted-phenyl ether ester are sodium salts, potassium salts, ammonium salts and the like of sulfuric ester and phosphoric ester. Of these, sodium salts of sulfuric esters are preferable.

Although the salts of polyoxyethylene substituted-phenyl ether ester are not particularly limited, salts of polyoxyethylene substituted-phenyl ether sulfuric ester represented by the formula (XX) in the free acid form:

$$Q-O(CH_2CH_2O)_q-SO_3H \qquad (XX)$$

wherein Q is α-methylbenzyl or phenyl substituted with $C_1-C_{16}$ alkyl and q is an integer of 1–20, are preferable. Of these, salts of sulfuric ester represented by the formula (XXI) in the free acid form:

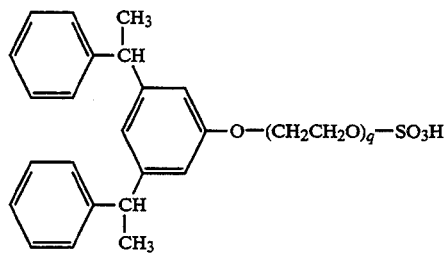

(XXI)

wherein q is as defined above, and salts of sulfuric ester represented by the formula (XXII) in the free acid form:

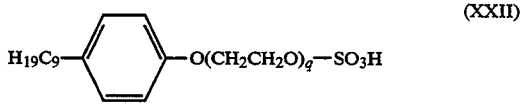

(XXII)

wherein q is as defined above, are more preferable. Of these, the salts of sulfuric ester (XXII) are most preferable.

The salts of polyoxyethylene substituted-phenyl ether ester may be a single compound or a mixture of compounds with different q.

Although the content of the salts of polyoxyethylene substituted-phenyl ether ester is not particularly limited, it is preferably from 0.01 to 20% by weight and more preferably from 0.05 to 5% by weight, based on the weight of the reactive dye.

Although the method for producing the salts of polyoxyethylene substituted-phenyl ether ester used in the present invention is not particularly limited, it can be obtained in the following manner, for example.

Thus, after adjusting the temperature of a starting polyoxyethylene substituted-phenyl ether to 10°–90° C., sulfamic acid is added thereto. If desired, the resultant mixture is aged at 90°–150° C. for 1–10 hours in a nitrogen gas atmosphere to obtain a mixture containing an ammonium salt of polyoxyethylene substituted-phenyl ether sulfuric ester. If desired, the mixture containing the ammonium salt is cooled to 10°–90° C., sodium hydroxide is added thereto together with a quantity of water if necessary, and the resulting mixture is reacted at 30°–90° C. and cooled to 10°–50° C. to obtain an aqueous solution of sodium salt of polyoxyethylene substituted-phenyl ether sulfuric ester.

If desired, into the reactive dye composition of the invention may be additionally incorporated an alkylated or non-alkylated naphthalenesulfonic acid-formaldehyde condensate and/or ε-caprolactam.

The alkylated or non-alkylated naphthalenesulfonic acid-formaldehyde condensate is well known as disclosed in, for example, JP-A- 51 - 52435 and JP-A-56-173257, and is not particularly limited. Among them, however, those having zero to three $C_1-C_4$ alkyl groups are preferable, and those having one or two methyl or ethyl groups are particularly preferable. The alkylated or non-alkylated naphthalenesulfonic acid-formaldehyde condensate may be a single compound, a mixture of the alkylated ones and non-alkylated ones, or a mixture of those having different numbers of different alkyl group, etc.

The alkylated or non-alkylated naphthalenesulfonic acid-formaldehyde condensate preferably has a sulfonation degree of 50 to 150%.

The alkylated or non-alkylated naphthalenesulfonic acid-formaldehyde condensate preferably has an average condensation degree of 1.1 to 3.0.

Although the content of the alkylated or non-alkylated naphthalenesulfonic acid-formaldehyde condensate is not particularly limited, it is preferably 100% by weight or less, and more preferably 50% by weight or less, based on the weight of the reactive dye.

The content of ε-caprolactam is not particularly limited, and usually it is 30% by weight or less based on the weight of the reactive dye.

In the preparation of the reactive dye composition of the invention, the alkylated or non-alkylated naphthalenesulfonic acid-formaldehyde condensate is preferably used. Particularly when the reactive dye is the anthraquinone reactive dye represented by the aforementioned formula (III) or (IV), it is preferable to use both the alkylated or non-alkylated naphthalenesulfonic acid-formaldehyde condensate and ε-caprolactam in an amount of 1 to 30% by weight, respectively.

The reactive dye composition of the invention can be obtained by blending together the reactive dye, salt of polyoxyethylene substituted-phenyl ether ester and, if desired, other additives. The method of blending is not particularly limited, but the blending may be carried out either prior to putting the composition to a dyeing use, or in the process of dyeing, or in the process of producing the reactive dye.

If desired, the reactive dye composition of the invention may contain an inorganic salt such as anhydrous sodium sulfate, sodium chloride and the like, a dispersing agent, a dusting inhibitor, a pH stabilizer, a sequestering agent such as polyphosphate, an antifoaming agent, water, other known dyeing assistants, etc.

The reactive dye composition of the invention is not limited in its form, but it may have a known form such as powder, granule and liquid.

The cellulose fiber material of the invention is not particularly limited, and specific examples thereof are natural and regenerated cellulose fibers such as cotton, linen, flax, jute, ramie fiber, viscose rayon, Bemberg fiber and the like. Specific examples of the cellulose fiber-containing fiber materials are cotton/polyester union fabric, cotton/nylon union fabric, cotton/wool union fabric, and the like.

In the present invention, the methods for dyeing and printing may be the same as the known ones. As a method of exhaustion dyeing, a method which comprises using a known inorganic neutral salt such as anhydrous sodium sulfate, sodium chloride or the like and a known acid binding agent such as sodium carbonate, sodium bicarbonate, sodium hydroxide, potassium hydroxide, sodium tertiary phosphate, commercially available synthetic alkali agent or the like either singly or in combination can be referred to, although the dyeing assistants used are not limited to the above-mentioned ones. Although there is no limitation on the amounts of the inorganic neutral salt and acid binding agent, they are used preferably in an amount of at least 1 g/liter. Although they may be used in an amount of 200 g/liter or more, a small amount of 40 g/liter is enough to carry out dyeing in the present invention. The inorganic neutral salt and acid binding agent may be fed into the dyeing bath either in one portion or in portions in the conventional manner. Dyeing assistants such as level dyeing agents, retarding agents, dye bath lubricants and the like may be used according to known methods, though dyeing assistants are not limited to the above-mentioned ones. The dyeing temperature is usually 30°–95° C. In the cold batch up dyeing process, a method which comprises padding a fiber material with an inorganic salt such as anhydrous sodium sulfate, sodium chloride and the like and a known acid binding agent such as sodium hydroxide, sodium silicate or the like and allowing the thus treated fiber material to stand in a tightly closed package at a constant temperature can be referred to. In the continuous dyeing process, a one-bath padding process which comprises mixing a known acid binding agent such as sodium carbonate, sodium bicarbonate or the like into a dye padding solution, carrying out padding in the conventional manner and thereafter carrying out dyeing by means of dry heat or steam-heat; and a two-bath padding process which comprises padding a fiber material with a dye, thereafter padding the fiber material with an inorganic neutral salt such as anhydrous sodium sulfate, sodium chloride or the like and a known acid binding agent such as sodium hydroxide, sodium silicate or the like and then carrying out dyeing according to known method by means of dry heat or steam-heat, etc. Can be referred to. In the printing, one-phase printing process which comprises printing a fiber material with a printing paste containing a known acid binding agent such as sodium bicarbonate or the like and thereafter carrying out printing by means of dry heat or steam-heat in the conventional manner; two-bath printing process which comprises printing a fiber material with a printing paste and thereafter throwing the fiber material into a high temperature solution containing an inorganic neutral salt such as sodium chloride or the like and a known acid binding agent such as sodium hydroxide, sodium silicate or the like to make progress a printing, etc. can be referred to. Needless to say, the methods of dyeing and printing are not limited to those mentioned above.

The reactive dye composition of the invention is particularly characterized by its excellent solubility in water and aqueous alkali solution. An aqueous solution prepared from the composition of the invention is stable, and a uniform and deep-colored dyed or printed product can be obtained by the use of the composition of the invention.

Next, the present invention is explained in more detail by way of the following examples. In the examples, parts and % are both by weight.

EXAMPLE 1

Seventy five parts of a dye represented by the following formula (1) in the free acid form:

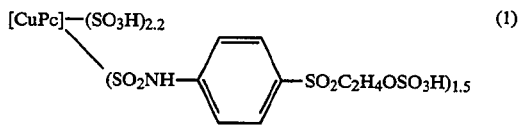

(1)

wherein [CuPc] denotes copper phthalocyanine, and 0.3 part of sodium salt of polyoxyethylene substituted-phenyl ether sulfate represented by the following formula (2) in the free acid form:

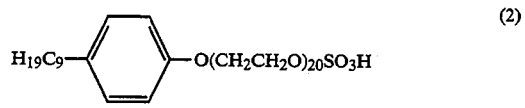

(2)

were thoroughly mixed with 23.7 parts of anhydrous sodium sulfate and 1 part of a mineral oil emulsion.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform, deep and clear blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, deep and clear blue-colored dyed product was obtained.

COMPARATIVE EXAMPLE 1

A dye composition was prepared by repeating Example 1, except that the sodium salt of polyoxyethylene substituted-phenyl ether ester was replaced with anhydrous sodium sulfate while keeping the other ingredients at the same ratio as above. After dissolving 100 g of the dye composition thus obtained in hot water, the resulting solution was cooled to 25° C., 150 g of 50° Baumé sodium silicate and 15 ml of 32.5% caustic soda solution were added thereto, and then water was immediately added to adjust the total volume to 1 liter at 25° C. After 10 minutes, the dye precipitated, and the dyeing procedure could not be continued further.

EXAMPLE 2

Seventy three parts of a dye represented by formula (3) in the free acid form:

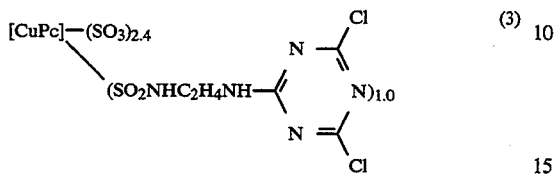

wherein CuPc is as defined above, and 0.5 part of sodium salt of polyoxyethylene substituted-phenyl ether sulfate represented by formula (4) in the free acid form:

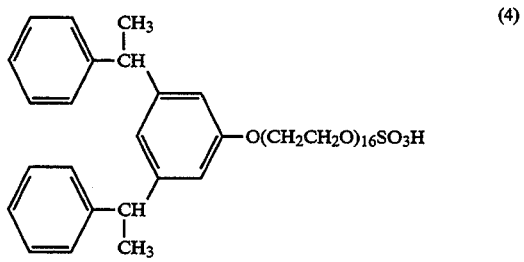

were thoroughly mixed with 25.5 pats of anhydrous sodium sulfate and 1 part of a mineral oil emulsion.

(a) After dissolving 100 g of the dye composition obtained above in hot water, the resulting solution was cooled to 25° C. Thereto were added 150 g of 50° Baumé sodium silicate and 25 ml of 32.5% caustic soda solution, and water was immediately added to adjust the total volume to 1 liter at 25° C. Just after it, a woven fabric of cotton was padded with the solution obtained above as a padding solution in the conventional manner. The padded fabric was immediately wound up, sealed with a polyethylene film, and allowed to stand indoors at 20° C. for 20 hours. Then, the dyed product was washed in the conventional manner to remove the unfixed dye, and dried. The dyed product thus obtained had a spotless, uniform, clear and deep blue color.

(b) The padding solution obtained in (a) was allowed to stand at 25° C. for 120 minutes. No deposition of dye in the dye solution was observed. When the solution was used for padding a woven cotton fabric in the same manner as in (a), a uniform, Clear and deep blue-colored dyed product was obtained.

EXAMPLE 3

Seventy five parts of a dye represented by formula (5) in the free acid form:

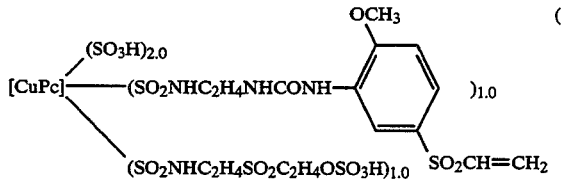

wherein CuPc is as defined above, and 1 part of sodium salt of polyoxyethylene substituted-phenyl ether sulfate represented by formula (6) in the free acid form:

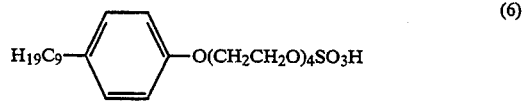

were thoroughly mixed with 4 parts of monomethylnaphthalene-sulfonic acid-formaldehyde condensate (sodium salt ), 1 part of dimethylnaphthalenesulfonic acid-formaldehyde condensate (sodium salt), 1 part of a mineral oil emulsion and 18 parts of anhydrous sodium sulfate.

(a) After dissolving 100 g of the dye composition obtained above in hot water, the resulting solution was cooled to 25° C. Thereto were added 30 g of anhydrous sodium sulfate and 25 ml of 32.5% caustic soda solution, and water was immediately added to adjust the total volume to 1 liter at 25° C. Just after it, a woven fabric of cotton was padded with the solution obtained above as a padding solution in the conventional manner. The padded fabric was immediately wound up, sealed with a polyethylene film, and allowed to stand indoors at 20° C. for 20 hours. Then, the dyed product was washed in the conventional manner to remove the unfixed dye, and dried. The dyed product thus obtained had a spotless, uniform, clear and deep blue color.

(b) The padding solution obtained in (a) was allowed to stand at 25° C. for 100 minutes. No deposition of dye in the dye solution was observed. When the solution was used for padding a woven cotton fabric in the same manner as in (a), a uniform, clear, deep blue-colored dyed product was obtained.

EXAMPLE 4

Sixty five parts of a dye represented by formula (7) in the free acid form:

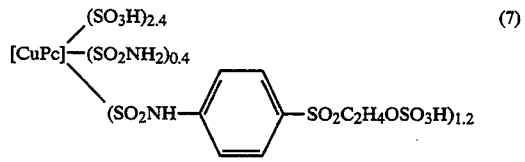

wherein CuPc is as defined above, and 1.95 parts of sodium salt of polyoxyethylene substituted-phenyl ether sulfate represented by formula (8) in the free acid form:

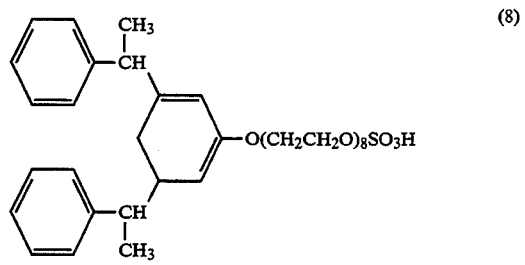

were thoroughly mixed with 0.05 part of sodium salt of polyoxyethylene substituted-phenyl ether sulfate represented by formula (2) in the free acid form, 1 part of a mineral oil emulsion and 22 parts of anhydrous sodium sulfate.

(a) A printing paste was prepared from 80 g of the dye composition obtained above, 550 g of sodium alginate, 350 g of hot water and 20 g of sodium bicarbonate. After printing No. 40 mercerized broad cotton cloth with the printing paste in the conventional manner, the cloth was steamed at 100° C. for 5 minutes, washed with cold water and hot water, soaped, washed with hot water and then cold water, and dried. The printed broad cotton cloth thus obtained had a uniform, clear and deep blue color.

(b) The printing paste obtained in (a) was allowed to stand at 25° C. for 3 days. No deposition of dye in the printing paste was observed. When the printing paste was used for printing a broad cotton cloth in the same manner as in (a), a uniform and deep blue-colored printed product was obtained.

EXAMPLE 5

In a wince dyeing machine was set 100 kg of a knit cotton fabric. The liquor ratio was adjusted to 1:15, and the water temperature was adjusted to 85° C. Seventy parts of a dye represented by formula (9) in the free acid form:

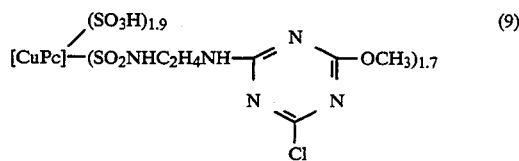

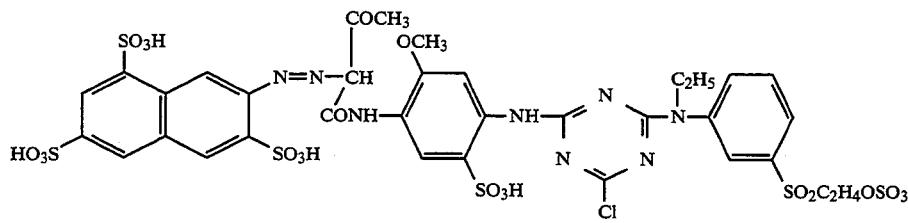

wherein CuPc is as defined above, and 2 parts of sodium salt of polyoxyethylene substituted-phenyl ether sulfate represented by formula (10) in the free acid form:

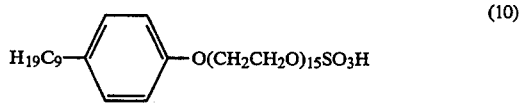

were thoroughly mixed with 1 part of a mineral oil emulsion and 27 parts of sodium chloride. After dissolving 6 kg of the dye composition thus obtained in the conventional manner, the resulting solution was thrown into a dyeing bath and the water temperature was kept at 85° C. Then, 90 kg of anhydrous sodium sulfate was added to the dyeing bath in the conventional manner, and a knit cotton fabric was treated at that temperature for 20 minutes. After adding 30 kg of sodium carbonate to the bath in the conventional manner, the knit cotton fabric was treated at the same temperature as above for 60 minutes to complete the dyeing. The dyed product thus obtained was finished by washing it in the conventional manner. The dyed product thus obtained had a spotless, uniform, clear and deep blue color.

EXAMPLE 6

One hundred kilograms of a knit fabric made of rayon fiber was set in a low liquor ratio type liquid flow dyeing apparatus, and the liquor ratio was adjusted to 1:6 and the water temperature was adjusted to 60° C. Forty parts of a dye represented by formula (11) in the free acid form:

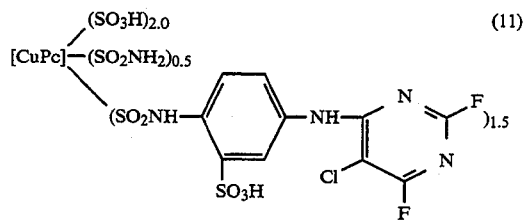

wherein CuPc is as defined above, 0.2 part of sodium salt of polyoxyethylene substituted-phenyl ether sulfate represented by formula (2) in the free acid form, 5 parts of monomethylnaphthalenesulfonic acid-formaldehyde condensate (sodium salt), 13.8 parts of anhydrous sodium sulfate and 1 part of a mineral oil emulsion were thoroughly mixed together. After dissolving 3 kg of the dye composition thus obtained in the conventional manner, the resulting solution was thrown into a dyeing bath and the water temperature was kept at 60° C. Further, 2 kg of a dye represented by formula (12) in the free acid form:

which had been dissolved previously was added to the bath, and then 40 kg of sodium chloride was added in the conventional manner. A knit fabric was treated at the same temperature as above for 30 minutes, and then 3 kg of sodium tertiary phosphate was added to the bath in the conventional manner. The knit fabric was treated at the same temperature as above for 60 minutes to complete the dyeing. The dyed product thus obtained was finished by washing it in the conventional manner. The dyed product obtained herein had a spotless, uniform and clear green color.

EXAMPLE 7

One hundred kilograms of a cheese-form cotton yarn was set in a cheese dyeing apparatus, and the liquor ratio and water temperature were adjusted to 1:10 and 70° C., respectively. On the other hand, 25 parts of a dye represented by formula (13) in the free acid form:

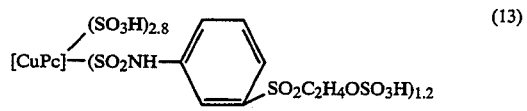

wherein CuPc is as defined above, and 45 parts of a dye represented by formula (14) in the free acid form:

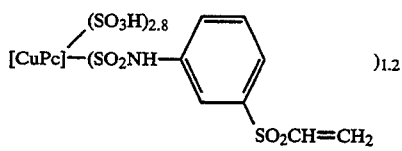

wherein CuPc is as defined above, were thoroughly mixed with 0.5 part of sodium salt of polyoxyethylene substituted-phenyl ether sulfate represented by formula (2) in the free acid form, 10 parts of dimethylnaphthalenesulfonic acid-formaldehyde condensate (sodium salt) and 19.5 parts of anhydrous sodium sulfate. After dissolving 3 kg of the dye composition thus obtained in the conventional manner, the resultant solution was thrown into a dyeing bath and the water temperature was kept at 70° C. After adding 50 kg of anhydrous sodium sulfate into the bath in the conventional manner, the yarn was treated at that temperature for 30 minutes, after which 2.5 kg of sodium carbonate and 1 kg of sodium hydroxide were thrown into the bath in the conventional manner. Then, the yarn was treated at that temperature for 60 minutes to complete the dyeing. The dyed yarn was finished by washing it in the conventional manner. The dyed yarn thus obtained had a uniform, clear and deep blue color and showed no difference in color density between the inner and outer layers of the cheese.

EXAMPLE 8

In a high pressure liquid flow dyeing machine was set 200 kg of a union knit fabric constituted of 50 parts of cotton fiber and 50 parts of polyester fiber. The liquor ratio was adjusted to 1:10, the water temperature was adjusted to 80° C. and pH was adjusted to 5 with acetic acid. Then, 1.0 kg of a disperse dye represented by formula (15):

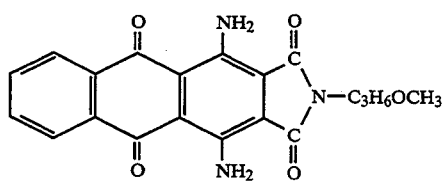

and 2 kg of dispersant (Sumipon TF, manufactured by Sumitomo Chemical Co., Ltd. ) which had been thoroughly dispersed in water previously were thrown into the bath. The bath temperature was elevated to 130° C. in 40 minutes, and the polyester part was dyed at this temperature for 40 minutes. Then, the dye solution was discharged, fresh water was fed, and the liquor ratio and water temperature were adjusted to 1:10 and 60° C., respectively. Then, 2.4 kg of a dye composition consisting of 40 parts of a dye represented by formula (1) in the free acid form, 40 parts of a dye represented by formula (3) in the free acid form, 0.2 part of sodium salt of polyoxyethylene substituted-phenyl ether sulfate represented by formula (2) in the free acid form and 19.8 parts of anhydrous sodium sulfate was dissolved in the conventional manner and thrown into the bath, and the water temperature was kept at 60° C. Then, 40 kg of anhydrous sodium sulfate was added to the bath in the conventional manner, the knit fabric was treated at this temperature for 20 minutes, 30 kg of sodium carbonate was thrown into the bath in the conventional manner, and the knit fabric was treated at the same temperature as above for 60 minutes to complete the dyeing. The dyed product was finished by washing it in the conventional manner. The dyed product obtained herein had a spotless, uniform and clear blue color.

EXAMPLE 9

Eighty grams of the dye composition obtained in Example 1 was dissolved in hot water and cooled to 25° C. To the dye solution thus obtained were added 1 g of sodium alginate, 10 g of sodium meta-nitrobenzenesulfonate and 20 g of sodium bicarbonate. Water was added to the mixture to adjust the total volume to 1 liter, just after which the solution thus obtained was used as a padding solution to pad a woven fabric of cotton. The padded fabric was dried at 120° C. for 2 minutes, and then steamed at 100° C. for 5 minutes to fix the dye. The dyed product thus obtained had a uniform, clear and deep blue color.

EXAMPLE 10

In a liquid flow dyeing machine was set 100 kg of a knit cotton fabric, and the liquor ratio and water temperature were adjusted to 1:15 and 60° C., respectively. Then, 0.6 kg of the dye composition obtained in Example 1, 0.5 kg of a dye represented by formula (16) in the free acid form:

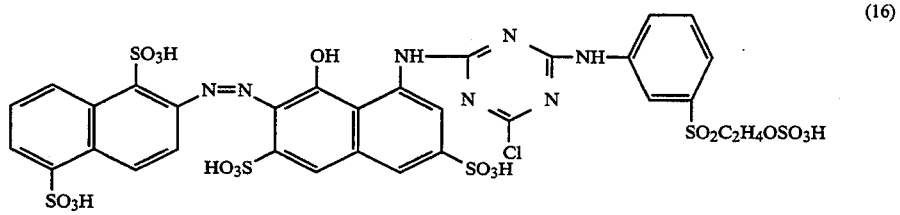

which had been dissolved previously, and 0.2 kg of a dye represented by formula (17) in the free acid form:

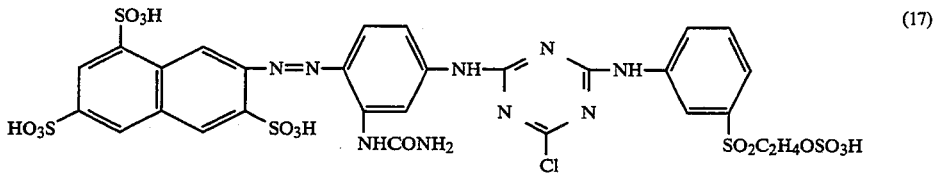

(17)

which had been dissolved previously were thrown into the bath. Further, 75 kg of anhydrous sodium sulfate was thrown into the bath in two portions in the conventional manner, the knit fabric was treated at that temperature for 20 minutes, 30 kg of sodium carbonate was added to the bath in three portions in the conventional manner, and the knit fabric was treated at the Same temperature as above for 60 minutes to complete the dyeing. The dyed product was finished by washing it in the conventional manner. The dyed product thus obtained had a spotless, uniform gray color.

EXAMPLE 11

Fifty kilograms of cheese-form cotton yarn was set in a cheese dyeing apparatus, and thee liquor ratio and water temperature were adjusted to 1:10 and 50° C., respectively. After dissolving 0.5 kg of the dye composition obtained in Example 1 and 0.5 kg of Sumifix Yellow 2GL special (manufactured by Sumitomo Chemical Co., Ltd.) in the conventional manner, the resulting solution was thrown into the bath, and the water temperature was kept at 60° C. After adding 25 kg of anhydrous sodium sulfate into the bath in the conventional manner, the yarn was treated at this temperature for 30 minutes. Then, 5 kg of sodium tertiary phosphate was added to the bath in the conventional manner. Then, the yarn was treated at the same temperature as above for 60 minutes to complete the dyeing. The dyed yarn was finished by washing it in the conventional manner. The dyed yarn thus obtained had a uniform and clear green and showed no difference in color density between the inner and outer layers of the cheese.

EXAMPLE 12

One hundred parts of a dye represented by formula (1) in the free acid form, 0.5 part of sodium salt of polyoxyethylene substituted-phenyl ether sulfate represented by formula (2), 25 parts of anhydrous sodium sulfate and 10 parts of $\epsilon$-caprolactam were thoroughly mixed together.

(a) Using the dye mixture thus obtained, dyeing was carried out in the same manner as in Example 1 (a). The dyed product thus obtained had a spotless, uniform, clear and deep blue color.

(b) A padding solution was allowed to stand in the same manner as in Example 1 (b). No deposition of dye was observed in the dye solution, and a uniform, clear, deep blue colored dyed product was obtained, as in (a).

EXAMPLE 13

One hundred parts of a dye represented by formula (3) in the free acid form, 0.5 part of sodium salt of polyoxyethylene substituted-phenyl ether sulfate represented by formula (2) in the free acid form, 25 parts of anhydrous sodium sulfate and 20 parts of $\beta$-caprolactam were thoroughly mixed together.

(a) Using the dye mixture thus obtained, dyeing was carried out in the same manner as in Example 1 (a). The dyed product thus obtained had a spotless, uniform, clear and deep blue color.

(b) The padding solution was allowed to stand in the same manner as in Example 1 (b). No deposition of dye was observed in the dye solution, and a uniform, clear and deep blue-colored dyed product was obtained, as in (a).

EXAMPLE 14

One hundred parts of a dye represented by formula (1) in the free acid form, 1 part of sodium salt of polyoxyethylene substituted-phenyl ether sulfate represented by formula (2) in the free acid form, 5 parts of monomethylnaphthalenesulfonic acid-formaldehyde condensate (sodium salt ), 5 parts of $\epsilon$-caprolactam and 20 parts of anhydrous sodium sulfate were thoroughly mixed together.

(a) Using the dye mixture thus obtained, dyeing was carried out in the same manner as in Example 1 (a). The dyed product thus obtained had a spotless, uniform, clear and deep blue color.

(b) The padding solution was allowed to stand in the same manner as in Example 1 (b). No deposition of dye was observed in the dye solution, and a uniform, clear and deep blue-colored dyed product was obtained, as in (a).

EXAMPLE 15

One hundred parts of a dye represented by formula (3) in the free acid form, 1 part of sodium salt of polyoxyethylene substituted-phenyl ether sulfate represented by formula (2) in the free acid form, 25 parts of dimethylnaphthalenesulfonic acid-formaldehyde condensate (sodium salt ), 5 parts of $\epsilon$-caprolactam and 20 parts of anhydrous sodium sulfate were thoroughly mixed together.

(a) Using the dye mixture thus obtained, dyeing was carried out in the same manner as in Example 1 (a). The dyed product thus obtained had a spotless, uniform, clear and deep blue color.

(b) The padding solution was allowed to stand in the same manner as in Example 1 (b). No deposition of dye was observed in the dye solution, and a uniform, clear and deep blue-colored dyed product was obtained, as in (a).

EXAMPLE 16

One hundred parts of a dye represented by formula (1) in the free acid form, 1 part of sodium salt of polyoxyethylene substituted-phenyl ether sulfate represented by formula (2) in the free acid form, 35 parts of monomethylnaphthalenesulfonic acid-formaldehyde condensate (sodium salt) and 25 parts of anhydrous sodium sulfate were thoroughly mixed together.

(a) Using the dye mixture thus obtained, dyeing was carried out in the same manner as in Example 1 (a). The dyed product thus obtained had a spotless, uniform, clear and deep blue color.

(b) The padding solution was allowed to stand in the same manner as in Example 1 (b). No deposition of dye was observed in the dye solution, and a uniform, clear and deep blue-colored dyed product was obtained, as in (a).

EXAMPLES 17–22

Dye mixtures were prepared by repeating Example 1, except that the dye represented by formula (1) was replaced with each of the dyes shown in Table 1. In the formulas, Cu and Ni denote that the central metal was copper and nickel, respectively.

(a) Using each dye mixture thus obtained, dyeing was carried out in the same manner as in Example 1 (a). The dyed products thus obtained all had a spotless, uniform, clear and deep blue color.

(b) Further, the padding solutions were allowed to stand in the same manner as in Example 1 (b). No deposition of dye was observed in the dye solutions, and uniform, clear and deep blue-colored dyed products were obtained therefrom, as in (a).

| Example No. | Dye (expressed in the free acid form) |
|---|---|
| 17 | 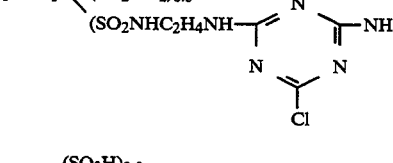 |
| 18 | 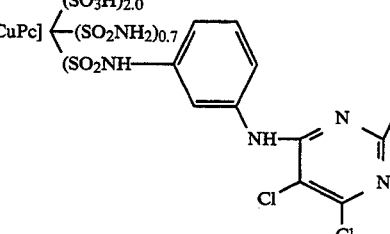 |
| 19 | 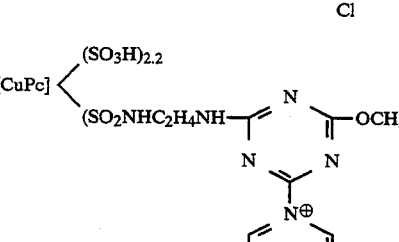 |
| 20 | 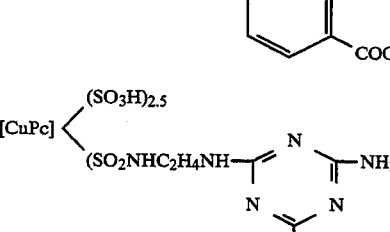 |
| 21 | $[NiPc] \langle \begin{array}{l}(SO_3H)_{2.8}\\(SO_2NH\text{—}\phi\text{—}SO_2C_2H_4OSO_3H)_{1.0}\end{array}$ |
| 22 | $[NiPc] \langle \begin{array}{l}(SO_3H)_{2.5}\\(SO_2NH_2)_{0.4}\\(SO_2NH\text{—}\phi\text{—}SO_2C_2H_4OSO_3H)_{1.1}\end{array}$ |

EXAMPLES 23–28

Dye mixtures were prepared by repeating Example 1, except that the polyoxyethylene substituted-phenyl ether sulfate represented formula (2) was replaced with each of the compounds shown in Table 2.

(a) Using the dye mixtures thus obtained, dyeing was carried out in the same manner as in Example 1 (a). The dyed products thus obtained all had a spotless, uniform, clear and deep blue color.

(b) Further, the padding solutions were allowed to stand in the same manner as in Example 1 (b). No deposition of dye was observed in the dye solutions, and uniform, clear and deep blue-colored dyed products were obtained therefrom, as in (a).

| Example No. | Salt of polyoxyethylene substituted-phenyl ether ester (expressed in the free acid form) |
|---|---|
| 23 |  |
| 24 | (structure with CH(CH3)-phenyl groups, $-O(CH_2CH_2O)_{20}SO_3H$) |
| 25 | $H_{17}C_8\text{—}\phi\text{—}O(CH_2CH_2O)_{18}SO_3H$ |

| Example No. | Salt of polyoxyethylene substituted-phenyl ether ester (expressed in the free acid form) |
|---|---|
| 26 | 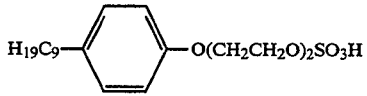 |
| 27 | 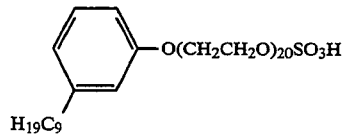 |
| 28 | 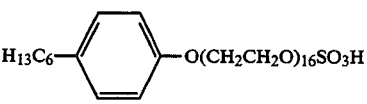 |

EXAMPLE 29

Eighty parts of a dye represented by formula (1) in the free acid form and 5 parts of sodium salt of polyoxyethylene substituted-phenyl ether phosphate represented by formula (18) in the free acid form:

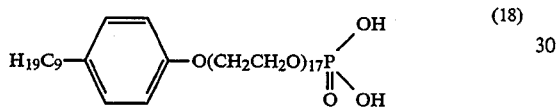

were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform, deep and clear blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform, deep and clear blue-colored dyed product was obtained.

EXAMPLE 30

Eighty parts of a dye represented by formula (1) in the free acid form and 5 parts oil ammonium salt of polyoxyethylene substituted-phenyl ether sulfate represented by formula (19) in the free acid form:

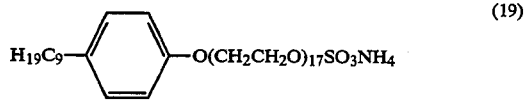

were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform, deep and clear blue color.

(a) The padding solution obtained in (a) was allowed to stand at 25° C. for 60 minutes. No deposition of dye was observed in the dye solution. When the solution was used for padding a woven fabric of cotton in the same manner as in (a), a uniform, deep and clear blue-colored dyed product was obtained.

EXAMPLE 31

Seventy three parts of a dye represented by formula (20) in the free acid form:

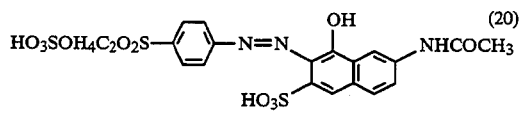

were thoroughly mixed with 1 part of sodium salt of polyoxyethylene substituted-phenyl ether sulfate represented by formula (2) in the free acid form, 25 parts of anhydrous sodium sulfate and 1 part of a mineral oil emulsion.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep orange-colored dyed product was obtained.

COMPARATIVE EXAMPLE 2

Seventy three parts of a dye represented by formula (20) in the free acid form, 26 parts of anhydrous sodium sulfate and 1 part of a mineral oil emulsion were thoroughly mixed together. After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after the adjustment, the dye precipitated, and the dyeing could not be continued.

EXAMPLE 32

Sixty five parts of a dye represented by formula (21) in the free acid form:

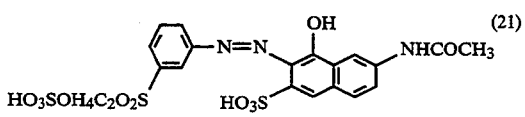

was thoroughly mixed with 0.5 part of sodium salt of polyoxyethylene substituted-phenyl ether sulfate represented by formula (4) in the free acid form, 15 parts of monomethylnaphthalenesulfonic acid-formaldehyde condensate (sodium salt) and 19.5 parts of anhydrous sodium sulfate.

(a) After dissolving 100 g of the dye composition thus obtained in hot water, the resulting solution was cooled to 25° C. Thereto were added 150 g of 50° Baumé sodium silicate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep orange-colored dyed product was obtained.

COMPARATIVE EXAMPLE 3

Sixty five parts of a dye represented by formula (21) in the free acid form, 15 parts of sodium salt of monomethylnaphthalenesulfonic acid-formaldehyde condensate ( sodium salt ) and 20 parts of anhydrous sodium sulfate were thoroughly mixed together. After dissolving 100 g of the dye composition thus obtained in hot water, the resulting solution was cooled to 25° C. Thereto were added 150 g of 50° Baumé sodium silicate and 15 ml of 32.5 parts caustic soda Solution, immediately after which water was added to adjust the total quantity to 1 liter at 25° C. Ten minutes after the adjustment, the dye precipitated, and the dyeing could not be continued.

EXAMPLE 33

Seventy parts of a dye represented by formula (20) in the free acid form, 20 parts of a dye represented by formula (21) in the free acid form, 3 parts of sodium salt of polyoxyethylene substituted-phenyl ether sulfate represented by formula (6) in the free acid form, 2.5 parts of monomethylnaphthalenesulfonic acid-formaldehyde condensate (sodium salt), 2.5 parts of dimethylnaphthalenesulfonic acid-formaldehyde condensate (sodium salt) and 2 parts of anhydrous sodium sulfate were thoroughly mixed together.

(a) After dissolving 100 g of the dye composition thus obtained in hot water, the resulting solution was cooled to 25° C. Thereto were added 30 g of anhydrous sodium sulfate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 100 minutes. No deposition of dye was observed in the dye solution. When the solution was used for padding a woven fabric of cotton in the same manner as in (a), a uniform and deep orange-colored dyed product was obtained.

EXAMPLE 34

Seventy five parts of a dye represented by formula (20) in the free acid form, 0.1 part of sodium salt of polyoxyethylene substituted-phenyl ether sulfate represented by formula (2) in the free acid form, 0.1 part of sodium salt of polyoxyethylene substituted-phenyl ether sulfate represented by formula (4) in the free acid form, 10 parts of acetyl-γ acid, 10 parts of condensate (sodium salt) formed between formaldehyde and a mixture of 50 parts of monomethylnaphthalenesulfonic acid and 50 parts of dimethylnaphthalenesulfonic acid, 1 part of a mineral oil emulsion and 3.8 parts of ε-caprolactam were thoroughly mixed together.

(a) After dissolving 100 g of the dye composition thus obtained in hot water, the resulting solution was cooled to 25° C., Thereto was added 200 g of 50° Baumé sodium silicate, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 15 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep orange-colored dyed product was obtained.

EXAMPLE 35

In a wince dyeing machine was set 100 kg of a knit cotton fabric. The liquor ratio was adjusted to 1:15, and the water temperature was adjusted to 50° C. Sixty parts of a dye represented by formula (20) in the free acid form and 10 parts of a dye represented by formula (22) in the free acid form:

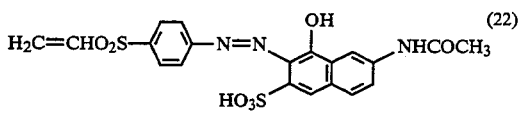

were thoroughly mixed with 3.5 parts of sodium salt of polyoxyethylene substituted-phenyl ether sulfate represented by formula (2) in the free acid form, 5 parts of ε-caprolactam and 25 parts of sodium chloride. After dissolving 6 kg of the dye composition thus obtained in the conventional manner, the resultant solution was thrown into a dyeing bath and the water temperature was kept at 50° C. Then, 90 kg of anhydrous sodium sulfate was added to the dyeing bath in the conventional manner, and a knit cotton fabric was treated at that temperature for 20 minutes. After adding 30 kg of sodium carbonate to the bath in the conventional manner, the knit cotton fabric was treated at the same temperature as above for 60 minutes to 10 complete the dyeing. The dyed product thus obtained was finished by washing it in the conventional manner. The dyed product thus obtained had a spotless, uniform and deep orange color.

EXAMPLE 36

One hundred kilograms of a knit fabric made of rayon fiber was set in a low liquor ratio type liquid flow dyeing apparatus, and the liquor ratio was adjusted to 1:6 and the water temperature was adjusted to 55° C. Twenty five parts of a dye represented by formula (23) in the free acid form:

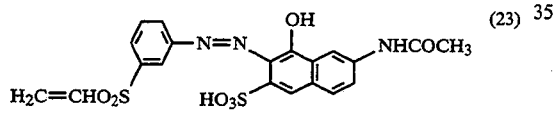

was thoroughly mixed with 55 parts of a dye represented by formula (21) in the free acid form, 0.2 part of sodium salt of polyoxyethylene substituted-phenyl ether sulfate represented by formula (4) in the free acid form, 5 parts of monomethylnaphthalenesulfonic acid-formaldehyde condensate (sodium salt) and 14.8 parts of ε-caprolactam. After dissolving 5 kg of the dye composition thus obtained in the conventional manner, the resultant solution was thrown into a dyeing bath and the water temperature was kept at 50° C. Then, 40 kg of sodium chloride was added in the conventional manner, and a knit fabric was treated at the same temperature as above for 30 minutes, and then 3 kg of sodium tertiary phosphate was added to the bath in the conventional manner. The knit fabric was treated at the same temperature as above for 60 minutes to complete the dyeing. The dyed product thus obtained was finished by washing it in the conventional manner. The dyed product obtained herein had a spotless, uniform and deep orange color.

EXAMPLE 37

One hundred kilograms of a cheese-form cotton yarn was set in a cheese dyeing apparatus, and the liquor ratio and water temperature were adjusted to 1:10 and 60° C., respectively. Then, 70 parts of a dye represented by formula (20) in the free acid form and 2.5 parts of sodium salt of polyoxyethylene substituted-phenyl ether sulfate represented by formula (24) in the free acid form:

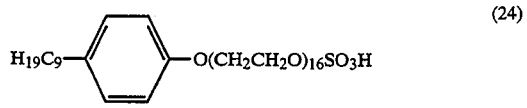

were thoroughly mixed with 27.5 parts of anhydrous sodium sulfate. After dissolving 3 kg of the dye composition thus obtained in the conventional manner, it was thrown into a dyeing bath and the water temperature was kept at 60° C. After adding 50 kg of anhydrous sodium sulfate into the bath in the conventional manner, the yarn was treated at that temperature for 30 minutes, after which 2.5 kg of sodium carbonate and 1 kg of sodium hydroxide were thrown into the bath in the conventional manner and the yarn was treated at that temperature for 60 minutes to complete the dyeing. The dyed yarn was finished by washing it in the conventional manner. The dyed yarn thus obtained had a uniform and deep orange color and showed no difference in color density between the inner and outer layers of the cheese.

EXAMPLE 38

In a high pressure liquid flow dyeing machine was set 200 kg of a union knit fabric constituted of 50 parts of a cotton fiber and 50 parts of a polyester fiber. The liquor ratio was adjusted to 1:10, the water temperature was adjusted to 80° C., and the pH was adjusted to 5 with acetic acid. Then, an aqueous dispersion in which 1.0 kg of a disperse dye represented by formula (25):

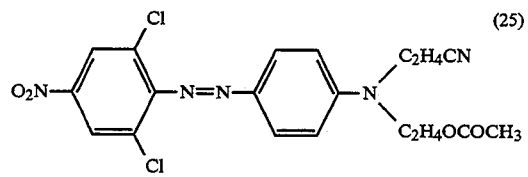

had previously been dispersed with 2 kg of a dispersant (Sumipon TF, manufactured by Sumitomo Chemical Co., Ltd.) was thrown into the bath. The bath temperature was elevated to 130° C. in 40 minutes, and the polyester part was dyed at this temperature for 40 minutes. Then, the dye solution was discharged, fresh water was fed, and the liquor ratio and water temperature were adjusted to 1:10 and 50° C., respectively. Then 2.4 kg of a dye composition consisting of 80 parts of a dye represented by formula (20) in the free acid form, 2 parts of sodium salt of polyoxyethylene substituted-phenyl ether sulfate represented by formula (2) in the free acid form and 18 parts of anhydrous sodium sulfate was dissolved in the conventional manner and thrown into the bath, and the water temperature was kept at 50° C. Then, 40 kg of anhydrous sodium sulfate was added to the bath in the conventional manner, the knit fabric was treated at this temperature for 20 minutes, 30 kg of sodium carbonate was thrown into the bath in the conventional manner, and the knit fabric was treated at the same temperature as above for 60 minutes to complete the dyeing. The dyed product was finished by washing it in the conventional manner. The dyed product obtained herein had a spotless, uniform and deep orange color.

EXAMPLE 39

Eighty grams of the dye composition obtained in Example 31 was dissolved in hot water, and the resulting solution was cooled to 25° C. Thereto were added 1 g of sodium alginate, 10 g of sodium metanitrobenzenesulfonate and 20 g of sodium bicarbonate, and water was further added to adjust the total quantity to 1 liter at 25° C. Just after it, a woven fabric of cotton was padded by using the solution obtained above as a padding solution. The padded cotton fabric was dried at 120° C. for 2 minutes and then steamed at 100° C. for 5 minutes to fix the dye. The dyed product was finished by washing it in the conventional manner. The dyed product obtained herein had a uniform and deep orange color.

EXAMPLE 40

A printing paste was prepared from 80 g of the dye composition obtained in Example 31, 50 g of urea, 550 g of sodium alginate, 300 g of hot water and 20 g of sodium bicarbonate. A No. 40 mercerized broad cotton fabric was printed with the printing paste in the conventional manner and then steamed at 100° C. for 5 minutes. Then, it was washed with cold water and hot water, soaped, washed with hot water and cold water, and dried. The broad cotton cloth thus obtained had a uniform and deep orange color.

EXAMPLE 41

In a liquid flow dyeing machine was set 100 kg of a cotton knit fabric, and the liquor ratio and water temperature were adjusted to 1:15 and 55° C. respectively. Then, 0.6 kg of the dye composition obtained in Example 31, 0.5 kg of a dye represented by formula (16) in the free acid form which had been dissolved previously, and 1 kg of a dye represented by formula (26) in the free acid form:

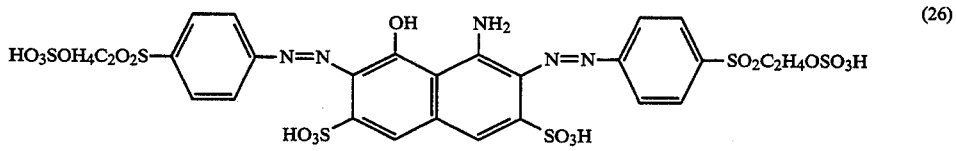

which had been dissolved previously were thrown into the bath in the conventional manner. Further, 75 kg of anhydrous sodium sulfate was thrown into the bath in two portions in the conventional manner, the knit fabric was treated at the same temperature as above for 20 minutes, 30 kg of sodium carbonate was added to the bath in three portions in the conventional manner, and the knit fabric was treated at the same temperature as above for 60 minutes to complete the dyeing. The dyed product was finished by washing it in the conventional manner. The dyed product thus obtained had a spotless and uniform light brown color.

EXAMPLE 42

Fifty kilograms of a cheese-form cotton yarn was set in a cheese dyeing apparatus, and the liquor ratio and water temperature were adjusted to 1:10 and 50° C., respectively. Then, 0.3 kg of the dye composition obtained in Example 32, 0.5 kg of Sumifix Yellow GR special (manufactured by Sumitomo Chemical Co., Ltd. ) and 0.4 kg of Sumifix Brilliant Blue R special (manufactured by Sumitomo Chemical Co., Ltd. ) were dissolved in the conventional manner and thrown into a dyeing bath and the water temperature was kept at 50° C. After adding 25 kg of anhydrous sodium sulfate into the bath in the conventional manner, the yarn was treated at that temperature for 30 minutes, after which 5 kg of sodium tertiary phosphate was thrown into the bath in the conventional manner. Then, the yarn was treated at that temperature for 60 minutes to complete the dyeing. The dyed yarn was finished by washing it in the conventional manner. The dyed yarn thus obtained had a uniform gray color and showed no difference in color density between the inner and outer layers of the cheese.

EXAMPLE 43

One hundred parts of a dye represented by formula (20) in the free acid form, 0.5 part of sodium salt of polyoxyethylene substituted-phenyl ether sulfate represented by formula (2) in the free acid form, 25 parts of anhydrous sodium sulfate and 10 parts of ε-caprolactam were thoroughly mixed together.

(a) Using the dye composition thus obtained, dyeing was carried out in the same manner as in Example 31 (a). The dyed product thus obtained had a spotless, uniform and deep orange color.

(b) The padding solution was allowed to stand in the same manner as in Example 31 (b). No deposition of dye was observed in the dye solution, and the dye solution could give a uniform and deep orange colored dyed product, as in ( a ).

EXAMPLE 44

One hundred parts of a dye represented by formula (21) in the free acid form, 0.5 part of sodium salt of polyoxyethylene substituted-phenyl ether sulfate represented by formula (2) in the free acid form, 25 parts of anhydrous sodium sulfate and 20 parts of ε-caprolactam were thoroughly mixed together.

(a) Using the dye composition thus obtained, dyeing was carried out in the same manner as in Example 31 (a). The dyed product thus obtained had a spotless, uniform and deep orange color.

(b) The padding solution was allowed to stand in the same manner as in Example 31 (b). No deposition of dye was observed in the dye solution, and the dye solution could give a uniform and deep orange colored dyed product, as in (a).

EXAMPLE 45

One hundred parts of a dye represented by formula (20) in the free acid form, 1 part of sodium salt of polyoxyethylene substituted-phenyl ether sulfate represented by formula (2) in the free acid form, 5 parts of monomethylnaphthalenesulfonic acid-formaldehyde condensate ( sodium salt ), 5 parts of ε-caprolactam and 20 parts of anhydrous sodium sulfate were thoroughly mixed together.

(a) Using the dye composition thus obtained, dyeing was carried out in the same manner as in Example 31

(a). The dyed product thus obtained had a spotless, uniform and deep orange color.

(b) The padding solution was allowed to stand in the same manner as in Example 31 (b). No deposition of dye was observed in the dye solution, and the dye solution could give a uniform and deep orange colored dyed product, as in (a).

EXAMPLE 46

One hundred parts of a dye represented by formula (21) in the free acid form, 1 part of sodium salt of polyoxyethylene substituted-phenyl ether sulfate represented by formula (2) in the free acid form, 25 parts of dimethylnaphthalenesulfonic acid-formaldehyde condensate (sodium salt), 5 parts of ε-caprolactam and 20 parts of anhydrous sodium sulfate were thoroughly mixed together.

(a) Using the dye composition thus obtained, dyeing was carried out in the same manner as in Example 31 (a). The dyed product thus obtained had a spotless, uniform and deep orange color.

(b) The padding solution was allowed to stand in the same manner as in Example 31 (b). No deposition of dye was observed in the dye solution, and the dye solution could give a uniform and deep orange colored dyed product, as in (a).

EXAMPLE 47

One hundred parts of a dye represented by formula (20) in the free acid form, 1 part of sodium salt of polyoxyethylene substituted-phenyl ether sulfate represented by formula (2) in the free acid form, 35 parts of monomethylnaphthalenesulfonic acid-formaldehyde condensate (sodium salt) and 25 parts of anhydrous sodium sulfate were thoroughly mixed together.

(a) Using the dye composition thus obtained, dyeing was carried out in the same manlier as in Example 31 (a). The dyed product thus obtained had a spotless, uniform and deep orange color.

(b) The padding solution was allowed to stand in the same manner as in Example 31 (b). No deposition of dye was observed in the dye solution, and the dye solution could give a uniform and deep orange colored dyed product, as in (a).

EXAMPLES 48–53

Dye mixtures were prepared by repeating Example 31, except that the polyoxyethylene substituted-phenyl ether ester salt represented by formula (2) was replaced with each of the compounds shown in Table 3.

(a) Using each dye mixture thus obtained, dyeing was carried out in the same manner as in Example 31 (a). The dyed products thus obtained all had a spotless, uniform and deep orange color.

(b) Further, the padding solutions were allowed to stand in the same manner as in Example 31 (b). No deposition of dye was observed in the dye solutions, and uniform and deep orange-colored dyed products were obtained therefrom, as in (a).

| Example No. | Salt of polyoxyethylene substituted-phenyl ether ester (expressed in the free acid form) |
| --- | --- |
| 48 | (diphenyl-substituted phenyl)-O(CH$_2$CH$_2$O)$_3$SO$_3$H with two CH(CH$_3$)(phenyl) substituents |
| 49 | (diphenyl-substituted phenyl)-O(CH$_2$CH$_2$O)$_{20}$SO$_3$H with two CH(CH$_3$)(phenyl) substituents |
| 50 | H$_{17}$C$_8$—C$_6$H$_4$—O(CH$_2$CH$_2$O)$_{18}$SO$_3$H |
| 51 | H$_{19}$C$_9$—C$_6$H$_4$—O(CH$_2$CH$_2$O)$_2$SO$_3$H |
| 52 | (H$_{19}$C$_9$)-substituted phenyl—O(CH$_2$CH$_2$O)$_{20}$SO$_3$H |
| 53 | H$_{13}$C$_6$—C$_6$H$_4$—O(CH$_2$CH$_2$O)$_{16}$SO$_3$H |

EXAMPLE 54

Eighty parts of a dye represented by formula (20) in the free acid form and 4 parts of sodium salt of polyoxyethylene substituted-phenyl ether phosphate represented by formula (18) in the free acid form were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep orange-colored dyed product was obtained, as in (a).

EXAMPLE 55

Eighty parts of a dye represented by formula (20) in the free acid form and 4 parts of ammonium salt of polyoxyethylene substituted-phenyl ether sulfate represented by formula (19) in the free acid form were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep orange color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep orange-colored dyed product was obtained.

EXAMPLE 56

A dye (82.8 parts) represented by formula (27) in the free acid form:

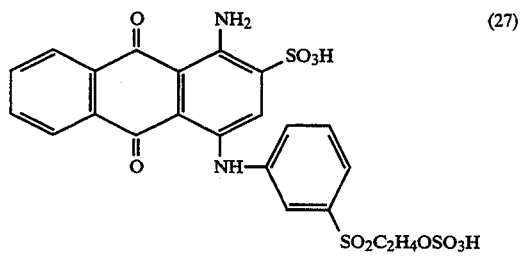

(27)

was thoroughly mixed with 0.2 part of sodium salt of polyoxyethylene substituted-phenyl ether sulfate represented by formula (2) in the free acid form, 12 parts of monomethylnaphthalenesulfonic acid-formaldehyde condensate (sodium salt) and 5 parts of ε-caprolactam.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform, clear and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, clear and deep blue-colored dyed product was obtained.

EXAMPLE 57

Sixty parts of a dye represented by formula (27) in the free acid form and 13 parts of a dye represented by formula (28) in the free acid form:

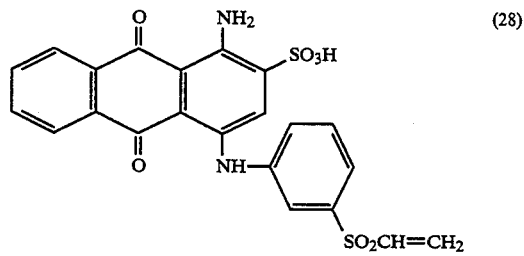

(28)

were thoroughly mixed with 0.5 part of sodium salt of polyoxyethylene-substituted phenyl ether sulfate represented by formula (4), 15 parts of monomethylnaphthalenesulfonic acid-formaldehyde condensate (sodium salt), 7 parts of ε-caprolactam and 4.5 parts of anhydrous sodium sulfate.

(a) After dissolving 100 g of the dye composition thus obtained in hot water, the resulting solution was cooled to 25° C. Thereto were added 150 g of 50° Baumé sodium silicate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform, clear and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, clear and deep blue-colored dyed product was obtained.

EXAMPLE 58

Seventy parts of a dye represented by formula (27) in the free acid form and 5 parts of a dye represented by formula (29) in the free acid form:

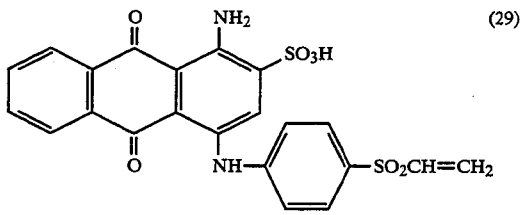

were thoroughly mixed with 2 parts of sodium salt of polyoxyethylene substituted-phenyl ether sulfate represented by formula (6), 6 parts of monomethylnaphthalenesulfonic acid-formaldehyde condensate (sodium salt), 6 parts of dimethylnaphthalenesulfonic acid-formaldehyde condensate (sodium salt), 8 parts of $\epsilon$-caprolactam, 1 part of a mineral oil emulsion and 2 parts of anhydrous sodium sulfate.

(a) After dissolving 100 g of the dye composition thus obtained in hot water, the resulting solution was cooled to 25° C. Thereto were added 30 g of anhydrous sodium sulfate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform, clear and deep blue color.

(b) The padding solution obtained in (a) was allowed to stand at 25° C. for 100 minutes. No deposition of dye was observed in the dye solution. When the solution was used for padding a woven fabric of cotton in the same manner as in (a), a uniform, clear and deep blue-colored dyed product was obtained.

EXAMPLE 59

Seventy five parts of a dye represented by formula (27) in the free acid form was thoroughly mixed with 0.05 part of sodium salt of polyoxyethylene substituted-phenyl ether sulfate represented by formula (2) in the free acid form, 0.05 part of sodium salt of polyoxyethylene substituted-phenyl ether sulfate represented by formula (4) in the free acid form, 15 parts of a condensate ( sodium salt ) formed between formaldehyde and a mixture of 50 parts of monomethylnaphthalenesulfonic acid and 50 parts of dimethylnaphthalenesulfonic acid, 8 parts of $\epsilon$-caprolactam, 1 part of a mineral oil emulsion and 0.9 part of anhydrous sodium sulfate.

(a) After dissolving 100 g of the dye composition thus obtained in hot water, the resulting solution was cooled to 25° C. Thereto were added 200 g of 50° Baumé sodium silicate, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 15 hours, and then the dyed product was washed in the conventional manner to remove the unfixed dye, and then dried. The dyed product thus obtained had a spotless, uniform, clear and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, clear and deep blue-colored dyed product was obtained.

EXAMPLE 60

In a wince dyeing machine was set 100 kg of a knit cotton fabric. The liquor ratio was adjusted to 1:15, and the water temperature was adjusted to 50° C. Seventy parts of a dye represented by formula (27) in the free acid form, 0.05 part of sodium salt of polyoxyethylene substituted-phenyl ether sulfate represented by formula (2) in the free acid form, 11.95 parts of monoethylnaphthalenesulfonic acid-formaldehyde condensate (sodium salt), 3 parts of $\epsilon$-caprolactam and 5 parts of sodium chloride were thoroughly mixed together. After dissolving 6 kg of the dye composition thus obtained in the conventional manner, the resultant solution was thrown into a dyeing bath and the water temperature was kept at 50° C. Then, 75 kg of anhydrous sodium sulfate was added to the dyeing bath, and a knit cotton fabric was treated at that temperature for 20 minutes. After adding 30 kg of sodium carbonate to the bath in the conventional manner, the knit cotton fabric was treated at the same temperature as above for 60 minutes to complete the dyeing. The dyed product was finished by washing it in the conventional manner. The dyed product thus obtained had a spotless, uniform, clear and deep blue color.

EXAMPLE 61

One hundred kilograms of a knit fabric made of rayon fiber was set in a low liquor ratio type liquid flow dyeing apparatus, and the liquor ratio was adjusted to 1:6 and the water temperature was adjusted to 65° C. Fifty parts of a dye represented by formula (27) in the free acid form, 25 parts of a dye represented by formula (28) in the free acid form, 0.2 part of sodium salt of polyoxyethylene substituted-phenyl ether sulfate represented by formula (2) in the free acid form, 14.8 parts of monomethylnaphthalenesulfonic acid-formaldehyde condensate (sodium salt) and 10 parts of $\epsilon$-caprolactam were thoroughly mixed together. After dissolving 5 kg of the dye composition thus obtained in the conventional manner, it was thrown into a dyeing bath and the water temperature was kept at 65° C. After adding 40 kg of sodium chloride into the bath, a knit fabric was treated at this temperature for 30 minutes, and then 3 kg of sodium tertiary phosphate was added to the bath. The knit fabric was treated at the same temperature as above for 60 minutes to complete the dyeing. The dyed product thus obtained was finished by washing it in the conventional manner. The dyed product obtained herein had a spotless, uniform, clear and deep blue color.

EXAMPLE 62

One hundred kilograms of a cheese-form cotton yarn was set in a cheese dyeing apparatus, and the liquor ratio and water temperature were adjusted to 1:10 and 55° C., respectively. Then, 70 parts of a dye represented by formula (27) in the free acid form, 0.5 part of sodium salt of polyoxyethylene substituted-phenyl ether sulfate represented by formula (24) in the free acid form, 10 parts of dimethylnaphthalenesulfonic acid-formaldehyde condensate (sodium salt), 3 parts of ε-caprolactam and 5 parts of anhydrous sodium sulfate were thoroughly mixed together. After dissolving 3 kg of the dye composition thus obtained in the conventional manner, the resultant solution was thrown into a dyeing bath and the water temperature was kept at 55° C. After adding 50 kg of anhydrous sodium sulfate into the bath in the conventional manner, the yarn was treated at that temperature for 30 minutes, after which 2.5 kg of sodium carbonate and 1 kg of sodium hydroxide were thrown into the bath and the yarn was treated at that temperature for 60 minutes to complete the dyeing. The dyed yarn was finished by washing it in the conventional manner. The dyed yarn thus obtained had a uniform, clear and deep blue color and showed no difference in color density between the inner and outer layers of the cheese.

EXAMPLE 63

In a high pressure liquid flow dyeing machine was set 200 kg of a union knit fabric constituted of 50 parts of a cotton fiber and 50 parts of a polyester fiber. The liquor ratio was adjusted to 1:10, the water temperature was adjusted to 80° C., and the pH was adjusted to 5 with acetic acid. Then, an aqueous dispersion in which 2.0 kg of a disperse dye represented by formula (30):

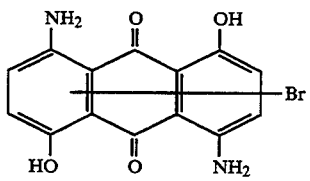

had previously been dispersed with 2 kg of a dispersant (Sumipon TF, manufactured by Sumitomo Chemical Co., Ltd.) was thrown into the bath. The bath temperature was elevated to 130° C. in 40 minutes, and the polyester part was dyed at this temperature for 40 minutes. Then, the dye solution was discharged, fresh water was fed, and the liquor ratio and water temperature were adjusted to 1:10 and 50° C., respectively. Then, 2.4 kg of a dye composition consisting of 80 parts of a dye represented by formula (27) in the free acid form, 0.2 part of sodium salt of polyoxyethylene substituted-phenyl ether sulfate represented by formula (2) in the free acid form, 11.8 parts of monomethylnaphthalenesulfonic acid-formaldehyde condensate (sodium salt), 3 parts of ε-caprolactam and 5 parts of anhydrous sodium sulfate was dissolved in the conventional manner and thrown into the bath, and the water temperature was kept at 50° C. Then, 40 kg of anhydrous sodium sulfate was added to the bath in the conventional manner, the knit fabric was treated at that temperature for 20 minutes, 30 kg of sodium carbonate was thrown into the bath in the conventional manner, and the knit fabric was treated at the same temperature as above for 60 minutes to complete the dyeing. The dyed product was finished by washing it in the conventional manner. The dyed product obtained herein had a spotless, uniform, clear and deep blue color.

EXAMPLE 64

Eighty grams of the dye composition obtained in Example 56 was dissolved in hot water, and the resulting solution was cooled to 25° C. To the dye solution were added 1 g of sodium alginate, 10 g of sodium metanitrobenzenesulfonate and 20 g of sodium bicarbonate, and then water was added to adjust the total quantity to 1 liter at 25° C. Just after it, the solution thus obtained was used for padding a woven cotton fabric. The padded cotton fabric was dried at 120° C. for 2 minutes and then steamed at 100° C. for 5 minutes to fix the dye. The dyed product was finished by washing it in the conventional manner. The dyed product thus obtained had a uniform and clear deep blue color.

EXAMPLE 65

A printing paste was prepared from 80 g of the dye composition obtained Example 56, 50 g of urea, 550 g of sodium alginate, 300 g of hot water and 20 g of sodium bicarbonate. After printing No. 40 mercerized broad cotton cloth with the printing paste in the conventional manner, the cloth was steamed at 100° C. for 5 minutes, washed with cold water and hot water, soaped, washed with hot water and cold water, and dried. The printed broad cotton cloth thus obtained had a uniform, clear and deep blue color.

EXAMPLE 66

In a liquid flow dyeing machine was set 100 kg of a cotton knit fabric, and the liquor ratio and water temperature were adjusted to 1:15 and 55° C., respectively. Then, 0.6 kg of the dye composition obtained in Example 56, 1.5 kg of a dye represented by formula (17) in the free acid form which had been dissolved previously, and 1 kg of a dye represented by formula (16) in the free acid form which had been dissolved previously were thrown into the bath in the conventional manner. Further, 75 kg of anhydrous sodium sulfate was thrown into the bath in two portions in the conventional manner, and the knit fabric was treated at the same temperature as above for 20 minutes. Then, 30 kg of sodium carbonate was added to the bath in three portions in the conventional manner, and the knit fabric was treated at the same temperature as above for 60 minutes to complete the dyeing. The dyed product was finished by washing it in the conventional manner. The dyed product thus obtained had a spotless and uniform light brown color.

EXAMPLE 67

Fifty kilograms of a cheese-form cotton yarn was set in a cheese dyeing apparatus, and the liquor ratio and water temperature were adjusted to 1:10 and 50° C., respectively. Then, 0.5 kg of the dye composition obtained in Example 57, 1 kg of Sumifix Yellow 2GL special (manufactured by Sumitomo Chemical Co., Ltd.) and 0.2 kg of Sumifix Brilliant Orange 3R special (manufactured by Sumitomo Chemical Co., Ltd.) were dissolved in the conventional manner and thrown into a dyeing bath and the water temperature was kept at 50° C. After adding 25 kg of anhydrous sodium sulfate into the bath in the conventional manner, the yarn was treated at that temperature for 30 minutes, after which 5 kg of sodium tertiary phosphate was thrown into the bath. Then, the yarn was treated at that temperature for 60 minutes to complete the dyeing. The dyed yarn was finished by washing it in the conventional manner. The dyed yarn thus obtained had a uniform gray color and showed no difference in color density between the inner and outer layers of the cheese.

EXAMPLES 68-73

Dye mixtures were prepared by repeating Example 56, except that the dye represented by formula (27) was replaced with each of the dyes shown in Tables 4 and 5.

(a) Using each dye mixture thus obtained, dyeing was carried out in the same manner as in Example 56 (a). The dyed products thus obtained all had a spotless, uniform, clear and deep blue color.

(b) Further, each padding solution was allowed to stand in the same manner as in Example 56 (b). No deposition of dye was observed in the dye solutions, and uniform and clear deep blue-colored dyed products were obtained therefrom, as in (a).

| Example No. | Dye (expressed in the free acid form) |
|---|---|
| 68 | anthraquinone with $NH_2$, $SO_3H$, $NH$—phenyl—$SO_2C_2H_4OSO_3H$ |
| 69 | anthraquinone with $NH_2$, $SO_3H$, $NH$—phenyl—$SO_2C_2H_4Cl$ |
| 70 | anthraquinone with $NH_2$, $SO_3H$, $NH$—phenyl—$SO_2C_2H_4OPO_3H_2$ |
| 71 | anthraquinone with $NH_2$, $SO_3H$, $NH$—phenyl—$SO_2C_2H_4SSO_3H$ |
| 72 | anthraquinone with $NH_2$, $SO_3H$, $NH$—phenyl—$SO_2C_2H_4OCOCH_3$ |
| 73 | anthraquinone with $NH_2$, $SO_3H$, $NH$—phenyl—$SO_2C_2H_4OSO_3H$ |

EXAMPLES 74-79

Dye mixtures were prepared by repeating Example 56, except that the sodium salt of polyoxyethylene substituted-phenyl ether sulfate represented by formula (2) was replaced with each of the compounds shown in Tables 6.

Using each dye mixture thus obtained, dyeing was carried out in the same manner as in Example 56 (a). The dyed products thus obtained all had a spotless, uniform, clear and deep blue color.

(b) Further, each padding solution was allowed to stand in the same manner as in Example 56 (b). No deposition of dye was observed in the dye solutions, and uniform and clear deep blue-colored dyed products were obtained therefrom, as in (a).

| Example No. | Salt of polyoxyethylene substituted-phenyl ether ester (expressed in the free acid form) |
|---|---|
| 74 | phenyl-CH($CH_3$)-substituted phenyl—$O(CH_2CH_2O)_3SO_3H$ with additional phenyl-CH($CH_3$)- substituent |
| 75 | phenyl-CH($CH_3$)-substituted phenyl—$O(CH_2CH_2O)_{20}SO_3H$ with additional phenyl-CH($CH_3$)- substituent |
| 76 | $H_{17}C_8$—phenyl—$O(CH_2CH_2O)_{18}SO_3H$ |
| 77 | $H_{19}C_9$—phenyl—$O(CH_2CH_2O)_2SO_3H$ |
| 78 | phenyl—$O(CH_2CH_2O)_{20}SO_3H$ with $H_{19}C_9$ substituent |
| 79 | $H_{13}C_6$—phenyl—$O(CH_2CH_2O)_{16}SO_3H$ |

EXAMPLE 80

Eighty six parts of a dye represented by formula (27) in the free acid form, 4 parts of sodium salt of polyoxyethylene substituted-phenyl ether phosphate represented by formula (18) in the free acid form, 8 parts of monomethylnaphthalenesulfonic acid-formaldehyde condensate (sodium salt) and 3 parts of ε-caprolactam were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform, deep blue-colored dyed product was obtained.

EXAMPLE 81

Eighty parts of a dye represented by formula (1) in the free acid form, 4 parts of ammonium salt of polyoxyethylene substituted-phenyl ether sulfate represented by formula (19) in the free acid form, 10 parts of monomethylnaphthalenesulfonic acid-formaldehyde condensate (sodium salt) and 5 parts of $\epsilon$-caprolactam were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform, deep blue-colored dyed product was obtained.

EXAMPLE 82

Seventy nine parts of a dye represented by formula (31) in the free acid form:

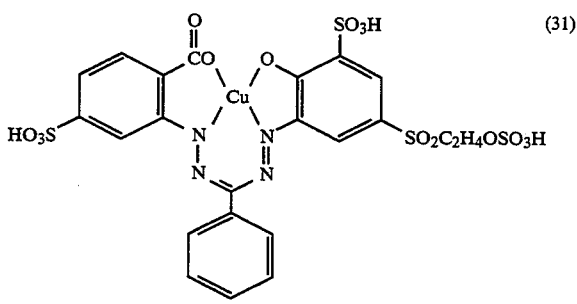

was thoroughly mixed with 1 part of sodium salt of polyoxyethylene substituted-phenyl ether sulfate represented by formula (2) in the free acid form and 20 parts of anhydrous sodium sulfate.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and; then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, deep blue-colored dyed product was obtained.

EXAMPLE 83

Seventy parts of a dye represented by formula (32) in the free acid form:

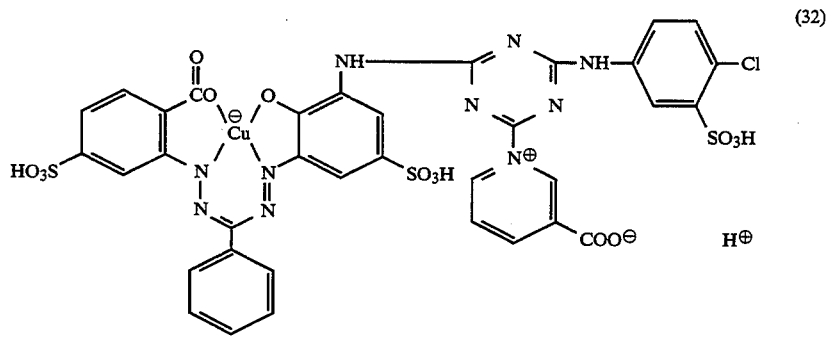

was thoroughly mixed with 2 parts of sodium salt of polyoxyethylene substituted-phenyl ether sulfate represented by formula (4) in the free acid form, 15 parts of monomethylnaphthalenesulfonic acid-formaldehyde condensate (sodium salt) and 13 parts of anhydrous sodium sulfate.

(a) After dissolving 100 g of the dye composition thus obtained in hot water, the resulting solution was cooled to 25° C. Thereto were added 150 g of 50° Baumé sodium silicate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, deep blue-colored dyed product was obtained.

EXAMPLE 84

Fifty parts of a dye represented by formula (33) in the free acid form:

EXAMPLE 85

In a high pressure liquid flow dyeing machine was set 200 kg of a union knit fabric constituted of 50 parts of a cotton fiber and 50 parts of a polyester fiber. The liquor ratio was adjusted to 1:10, the water temperature was adjusted to 80° C., and the pH was adjusted to 5 with acetic acid. Then, an aqueous dispersion in which 1 kg of a disperse represented by the aformentioned formula (30) had been previously dispersed with 2 kg of a dispersant (Sumipon TF, manufactured by Sumitomo Chemical Co., Ltd.) was thrown into the bath. The bath temperature was elevated to 130° C. in 40 minutes, and the polyester part was dyed at this temperature for 40 minutes. Then, the dye solution was discharged, fresh water was fed, and the liquor ratio and water temperature were adjusted to1:10 and 60° C., respectively. Then, 1.5 kg of a dye composition consisting of 80 parts of a dye represented by formula (34) in the free acid form:

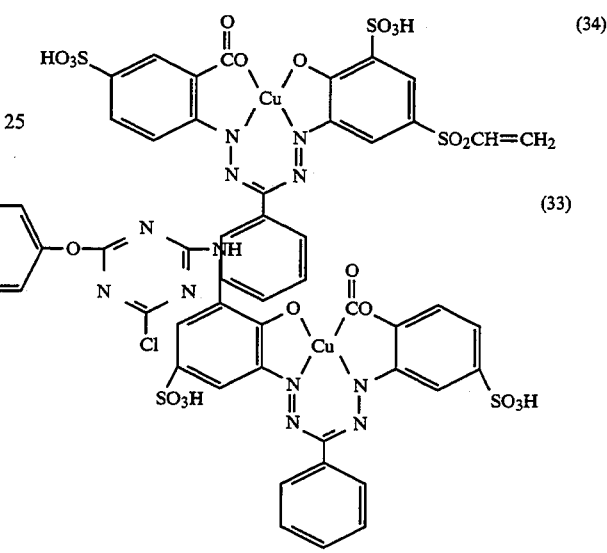

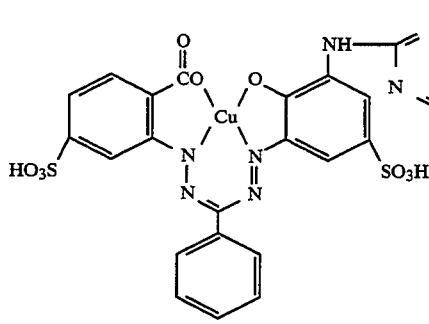

was thoroughly mixed with 5 parts of sodium salt of polyoxyethylene substituted-phenyl ether sulfate represented by formula (24) in the free acid form, 20 parts of dimethylnaphthalenesulfonic acid-formaldehyde condensate (sodium salt) and 25 parts of anhydrous sodium sulfate.

(a) After dissolving 100 g of the dye composition thus obtained in hot water, the resulting solution was cooled to 25° C. Thereto were added 30 g of anhydrous sodium sulfate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional, manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solutions. When the solution was used for padding a woven fabric of cotton in the same manner as in (a), a uniform, deep blue-colored dyed product was obtained.

and 2 parts of sodium salt of polyoxyethylene-substituted phenyl ether sulfate represented by formula (6) in the free acid form, 10 parts of mono- and di-methylnaphthalenesulfonic acid-formaldehyde condensate (sodium salt) and 8 parts of anhydrous sodium sulfate was dissolved in the conventional manner and thrown into the bath, and the water temperature was kept at 60° C. Then, 40 kg of anhydrous sodium sulfate was added to the bath in the conventional manner, the knit fabric was treated at this temperature for 20 minutes, 30 kg of sodium carbonate was thrown into the bath in the conventional manner, and the knit fabric was treated at the same temperature as above for 60 minutes to complete the dyeing. The dyed product was finished by washing it in the conventional manner. The dyed product obtained herein had a spotless, uniform and deep blue color.

EXAMPLE 86

In a liquid flow dyeing machine was set 100 kg of a cotton knit fabric, and the liquor ratio and water temperature were adjusted to 1:15 and 60° C., respectively. Then, 0.6 kg of the dye composition obtained in Example 82, 0.5 kg of a dye represented by formula (17) in the free acid form which had been dissolved previously, and 1 kg of a dye represented by formula (16) in the free acid form which had been dissolved previously were thrown into the bath in the conventional manner. Further, 75 kg of anhydrous sodium sulfate was thrown into the bath in two portions in the conventional manner, and the knit fabric was treated at the same temperature as above for 20 minutes. Then, 30 kg of sodium carbonate was added to the bath in three portions in the conventional manner, and the knit fabric was treated at the same temperature as above for 60 minutes to complete the dyeing. The dyed product was finished by washing it in the conventional manner. The dyed product thus obtained had a spotless and uniform light brown color.

EXAMPLE 87

Fifty kilograms of a cheese-form cotton yarn was set in a cheese dyeing apparatus, and the liquor ratio and water temperature were adjusted to 1:10 and 50° C. respectively Then, 1 kg of the dye composition obtained in Example 83, 1.5 kg of Sumifix Yellow GR special (manufactured by Sumitomo Chemical Co., Ltd.), 0.5 kg of Sumifix Brilliant Blue R special (manufactured by Sumitomo Chemical Co., Ltd.) and 1 kg of Sumifix Br. Red BB special (manufactured by Sumitomo Chemical Co., Ltd.) were dissolved in the conventional manner and thrown into a dyeing bath and the water temperature was kept at 50° C. After adding 25 kg of anhydrous sodium sulfate into the bath in the conventional manner, the yarn was treated at that temperature for 30 minutes, after which 5 kg of sodium tertiary phosphate was thrown into the bath in the conventional manner. Then, the yarn was treated at that temperature for 60 minutes to complete the dyeing. The dyed yarn was finished by washing it in the conventional manner. The dyed yarn thus obtained had a uniform light brown color and showed no difference in color density between the inner and outer layers of the cheese.

EXAMPLE 88

Eighty grams of the dye composition obtained in Example 82 was dissolved in hot water, and the resulting solution was cooled to 25° C. To the dye solution were added 1 g of 5% sodium alginate solution, 10 g of sodium meta-nitrobenzenesulfonate and 20 g of sodium bicarbonate, and then water was added to adjust the total quantity to 1 liter at 25° C. Just after it, the solution thus obtained was used for padding a woven cotton fabric. The padded cotton fabric was dried at 120° C. for 2 minutes and then steamed at 100° C. for 5 minutes to fix the dye. The dyed product was finished by washing it in the conventional manner. The dyed product thus obtained had a uniform and deep blue color.

EXAMPLE 89

A printing paste was prepared from 80 g of the dye composition obtained Example 82, 50 g of urea, 550 g of 5% sodium alginate solution, 300 g of hot water and 20 g of sodium bicarbonate. After printing No. 40 mercerized broad cotton cloth with the printing paste in the conventional manner, the cloth was steamed at 100° C. for 5 minutes, washed with cold water and hot water, soaped, washed with hot water and cold water, and dried. The printed broad cotton cloth thus obtained had a uniform and deep blue color.

EXAMPLES 90-95

Dye mixtures were prepared by repeating Example 82, except that the polyoxyethylene substituted-phenyl ether ester salt represented by formula (2) was replaced with each of the compounds Shown in Table 7.

(a) Using each of the dye mixtures thus obtained, dyeing was carried out in the same manner as in Examples 82 (a). The dyed products thus obtained all had a spotless, uniform and deep blue color.

(b) Each padding solution was allowed to stand in the same manner as in Example 82 (b). No deposition of dye was observed in the dye solutions, and dyed products having a uniform and deep blue color were obtained, as in (a).

| Example No. | Salt of polyoxyethylene substituted-phenyl ether ester (expressed in the free acid form) |
|---|---|
| 90 | 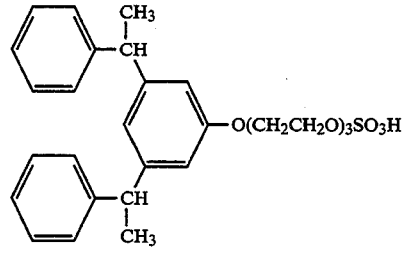 |
| 91 | 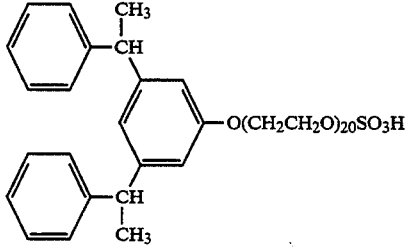 |
| 92 | 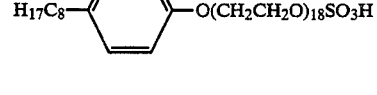 |
| 93 | 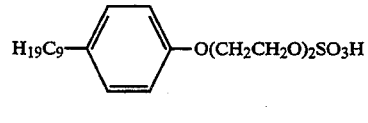 |
| 94 | 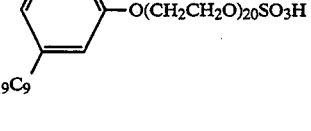 |
| 95 | 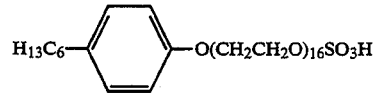 |

EXAMPLE 96

Eighty parts of a dye represented by formula (31) in the free acid form, 4 parts of sodium salt of polyoxyethylene substituted-phenyl ether phosphate represented by formula (18) in the free acid form and 16 parts of monoethylnaphthalenesulfonic acid-formaldehyde condensate were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep blue-colored dyed product was obtained.

EXAMPLE 98

Seventy nine parts of a dye represented by formula (35) in the free acid form:

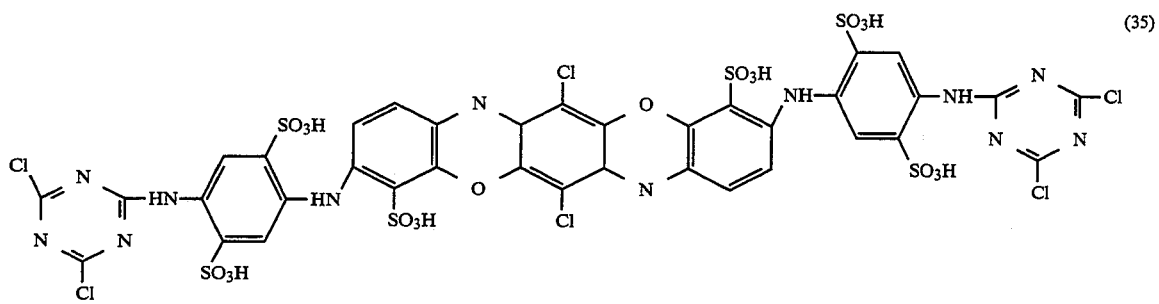

tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep blue-colored dyed product was obtained.

EXAMPLE 97

Eighty parts of a dye represented by formula (31) in the free acid form, 4 parts of ammonium salt of polyoxyethylene substituted-phenyl ether sulfate represented by formula (19) in the free acid form and 16 parts of dimethylnaphthalenesulfonic acid-formaldehyde condensate were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep blue-colored dyed product was obtained.

was thoroughly mixed with 1 part of sodium salt of polyoxyethylene substituted-phenyl ether sulfate represented by formula (2) in the free acid form and 20 parts of anhydrous sodium sulfate.

(a) After dissolving 100 g of the dye composition thus obtained in hot water, the resulting solution was cooled to 25° C. Thereto were added 50 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep blue-colored dyed product was obtained.

EXAMPLE 99

Seventy parts of a dye represented by formula (36) in the free acid form:

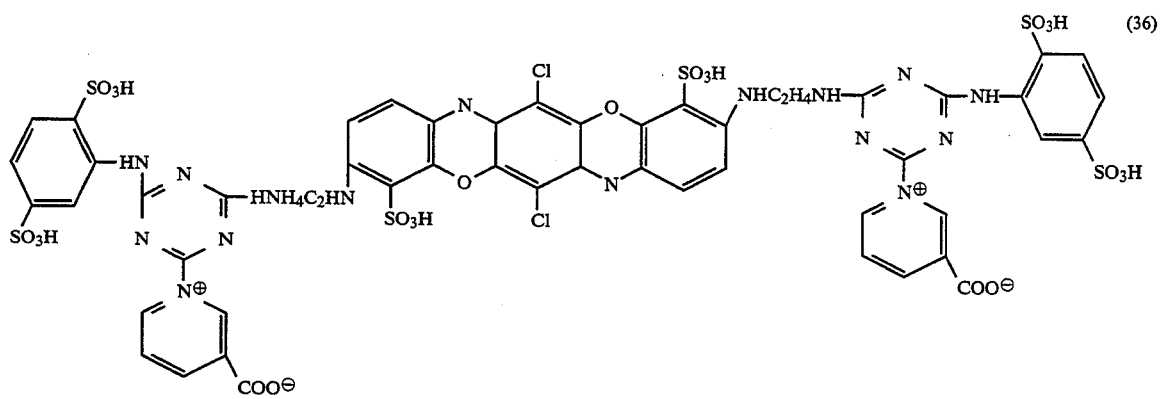

was thoroughly mixed with 2 parts of sodium salt of polyoxyethylene substituted-phenyl ether sulfate represented by formula (4) in the free acid form, 15 parts of monomethylnaphthalenesulfonic acid-formaldehyde condensate (sodium salt) and 13 parts of anhydrous sodium sulfate.

(a) After dissolving 100 g of the dye composition thus obtained in hot water, the resulting solution was cooled to 25° C. Thereto were added 150 g of 50° Baumé sodium silicate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep blue-colored dyed product was obtained.

EXAMPLE 100

Fifty parts of a dye represented by formula (37) in the free acid form:

(a) After dissolving 100 g of the dye composition thus obtained in hot water, the resulting solution was cooled to 25° C. Thereto were added 30 g of anhydrous sodium sulfate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep blue-colored dyed product was obtained.

EXAMPLE 101

In a high pressure liquid flow dyeing machine was set 200 kg of a union knit fabric constituted of 50 parts of a cotton fiber and 50 parts of a polyester fiber. The liquor ratio was adjusted to 1:10, the water temperature was adjusted to 80° C., and the pH was adjusted to 5 with acetic acid. Then, 1 kg of a disperse dye represented by formula (30) and 2 kg of dispersant (Sumipon TF, manufactured by Sumitomo Chemical Co., Ltd.) were thoroughly dispersed in water and thrown into the bath.

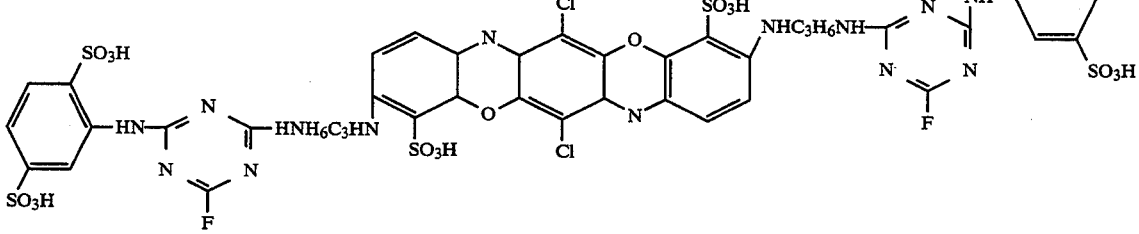

was thoroughly mixed with 5 parts of sodium salt of polyoxyethylene substituted-phenyl ether sulfate represented by formula (24) in the free acid form, 20 parts of dimethylnaphthalenesulfonic acid-formaldehyde condensate (sodium salt) and 25 parts of anhydrous sodium sulfate.

The bath temperature was elevated to 130° C. in 40 minutes, and the polyester part was dyed at this temperature for 40 minutes. Then, the dye solution was discharged, fresh water was fed, and the liquor ratio and water temperature were adjusted to 1:10 and 60° C., respectively. Then, 0.7 kg of a dye composition consisting of 80 parts of a dye represented by formula (38) in the free acid form:

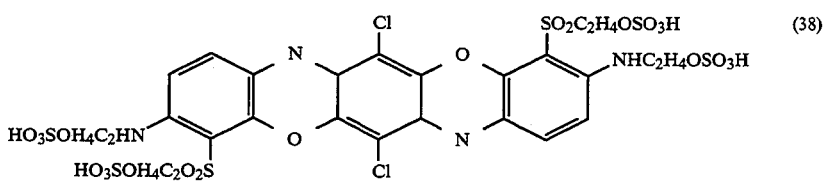

and 2 parts of sodium salt of polyoxyethylene substituted-phenyl ether sulfate represented by formula (4) in the free acid form, 10 parts of mono- and di-ethylnaphthalenesulfonic acid-formaldehyde condensate and 8 parts of anhydrous sodium sulfate was dissolved in the conventional manner and thrown into the bath, and the water temperature was kept at 60° C. Then, 40 kg of anhydrous sodium sulfate was added to the bath in the conventional manner, the knit fabric was treated at this temperature for 20 minutes, 30 kg of sodium carbonate was thrown into the bath in the conventional manner, and the knit fabric was treated at the s me temperature as above for 60 minutes to complete the dyeing. The dyed product was finished by washing it in the conventional manner. The dyed product obtained herein had a spotless, uniform and deep blue color.

EXAMPLE 102

In a liquid flow dyeing machine was set 100 kg of a cotton knit fabric, and the liquor ratio and water temperature were adjusted to 1:15 and 60° C., respectively. Then, 0.6 kg of a dye composition consisting of 99 parts of a dye represented by formula (39) in the free acid form:

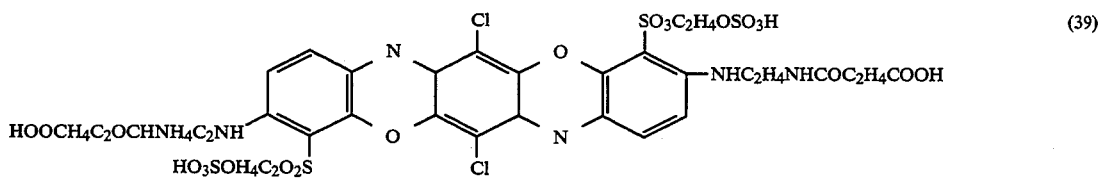

and 1 part of sodium salt of polyoxyethylene substituted-phenyl ether sulfate represented by formula (2) in the free acid form, 0.5 kg of a dye represented by formula (17) in the free acid form which had been dissolved previously and 1 kg of a dye represented by formula (16) in the free acid form which had been dissolved previously were thrown into the bath. Further, 75 kg of anhydrous sodium sulfate was thrown into the bath in two portions in the conventional manner, and the knit fabric was treated at the same temperature as above for 20 minutes. Then, 30 kg of sodium carbonate was added to the bath in three portions in the conventional manner, and the knit fabric was treated at the same temperature as above for 60 minutes to complete the dyeing. The dyed product was finished by washing it in the conventional manner. The dyed product thus obtained had a spotless and uniform light brown color.

EXAMPLE 103

Fifty kilograms of a cheese-form cotton yarn was set in a cheese dyeing apparatus, and the liquor ratio and water temperature were adjusted to 1:10 and 50° C., respectively. After dissolving 0.5 kg of a dye composition consisting of 97 parts of a dye represented by formula (40) in the free acid form:

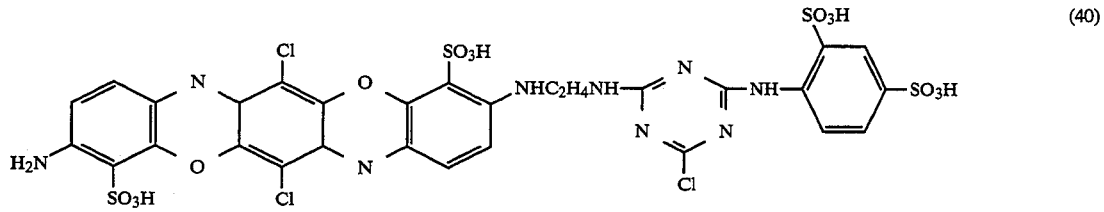

and 3 parts of sodium salt of polyoxyethylene substituted-phenyl ether sulfate represented by formula (4) in the free acid form, 1.1 kg of Kayacion Golden Yellow E-SNR (manufactured by Nippon Kayaku Co., Ltd.) and 0.3 kg of Procion Red H-E3B (manufactured by ICI) in the conventional manner, the resulting solution was thrown into the bath, and the water temperature was kept at 80° C. After adding 25 kg of anhydrous sodium sulfate in the conventional manner into the bath, the yarn was treated at this temperature for 30 minutes. Then, 10 kg of sodium carbonate was added to the bath in the conventional manner and then the yarn was treated at the same temperature as above for 60 minutes to complete the dyeing. The dyed yarn was finished by washing it in the conventional manner. The dyed yarn thus obtained had a uniform light brown color and showed no difference in color density between the inner and outer layers of the cheese.

EXAMPLE 104

Eighty grams of a dye composition consisting of 99.5 parts of a dye represented by formula (41) in the free acid form:

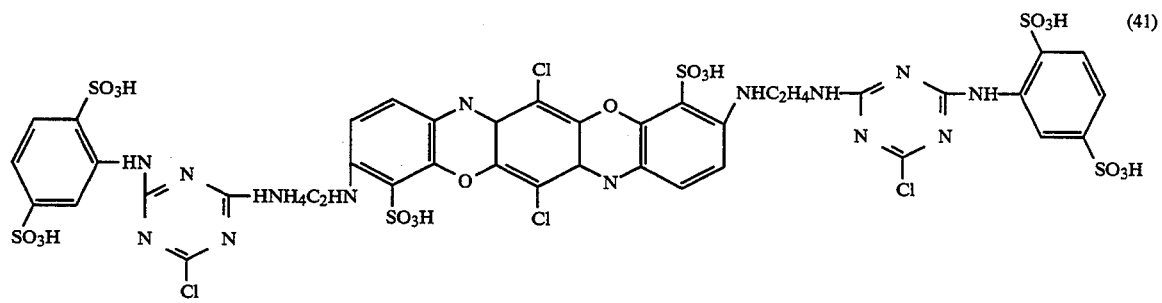

and 0.5 part of sodium salt of polyoxyethylene substituted-phenyl ether sulfate represented by formula (2) in the free acid form was dissolved in hot water and the resulting solution was cooled to 25° C. To the dye solution were added 1 g of sodium alginate, 10 g of sodium meta-nitrobenzenesulfonate and 20 g of sodium bicarbonate, and then water was added thereto to adjust the total quantity to 1 liter at 25° C. Just after it, a woven fabric of cotton was padded by using the solution obtained above as a padding solution. The padded woven fabric of cotton was dried at 120° C. for 2 minutes and then steamed at 100° C. for 5 minutes to fix the dye. The dyed product was finished by washing it in the conventional manner. The dyed product thus obtained had a uniform and deep blue color.

EXAMPLE 105

A printing paste was prepared from 80 g of a dye composition consisting of 95 parts of a dye represented by formula (42) in the free acid form:

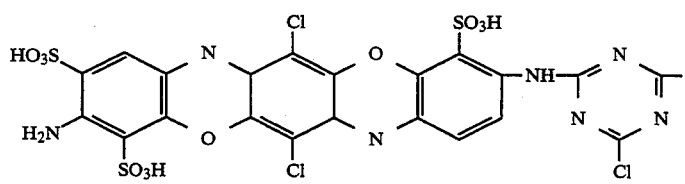

and 5 parts of sodium salt of polyoxyethylene substituted-phenyl ether sulfate represented by formula (4) in the free acid form, 50 g of urea, 550 g of 5% sodium alginate solution, 300 g of hot water and 20 g of sodium bicarbonate. A No. 40 mercerized broad cotton cloth was printed with the printing paste obtained above, and steamed at 100° C. for 5 minutes. Then, it was washed with cold water and hot water, soaped, washed with hot water and cold water and dried. The broad cotton cloth had a uniform and deep blue color.

EXAMPLES 106-111

Dye mixtures were prepared by repeating Example 98, except that the sodium salt of polyoxyethylene substituted-phenyl ether sulfate represented by formula (2) was replaced with each of the compounds shown in Table 8.

(a) Using each of the dye mixtures obtained above, dyeing was carried out in the same manner as in Example 98 (a). The dyed products thus obtained all had a spotless and uniform deep blue color.

(b) The padding solutions were allowed to stand in the same manner as in Example 98 (b). No deposition of dye was observed in the dye solutions, and uniform and deep blue-colored dyed products were obtained therefrom as in (a).

| Example No. | Salt of polyoxyethylene substituted-phenyl ether ester (expressed in the free acid form) |
|---|---|
| 106 | ![structure with two phenyl-CH(CH3) groups on central benzene with -O(CH2CH2O)3SO3H] |
| 107 | ![structure with two phenyl-CH(CH3) groups on central benzene with -O(CH2CH2O)20SO3H] |
| 108 | H17C8—⟨phenyl⟩—O(CH2CH2O)18SO3H |
| 109 | H19C9—⟨phenyl⟩—O(CH2CH2O)2SO3H |
| 110 | ⟨phenyl with H19C9⟩—O(CH2CH2O)20SO3H |

| Example No. | Salt of polyoxyethylene substituted-phenyl ether ester (expressed in the free acid form) |
| --- | --- |
| 111 | 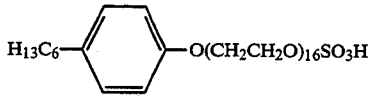 |

EXAMPLE 112

Eighty parts of a dye represented by formula (35) in the free acid form, 4 parts of sodium salt of polyoxyethylene substituted-phenyl ether phosphate represented by formula (18) in the free acid form and 16 parts of monoethylnaphthalenesulfonic acid-formaldehyde condensate were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep blue-colored dyed product was obtained.

EXAMPLE 113

Eighty parts of a dye represented by formula (35) in the free acid form, 4 parts of ammonium salt of polyoxyethylene substituted-phenyl ether sulfate represented by formula (19) in the free acid form and 16 parts of dimethylnaphthalenesulfonic acid-formaldehyde condensate were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep blue-colored dyed product was obtained.

EXAMPLE 114

82.8 Parts of a dye represented by formula (43) in the free acid form:

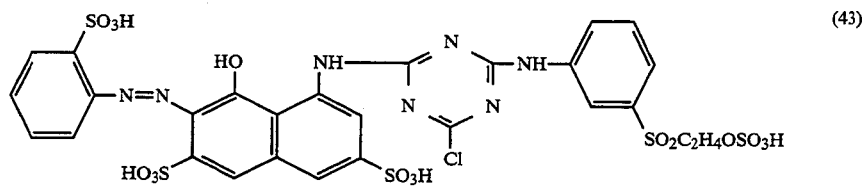

(43)

was thoroughly mixed with 0.2 part of sodium salt of polyoxyethylene substituted-phenyl ether sulfate represented by formula (2) in the free acid form and 12 parts of monomethylnaphthalenesulfonic acid-formaldehyde condensate (sodium salt).

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform and deep bluish red color.

(b) The padding solution obtained in (a) was allowed to stand at 25° C. for 120 minutes. No deposition of dye was observed in the dye solution. When the solution was used for padding a woven fabric of cotton in the same manner as in (a), a uniform and deep bluish red colored dyed product was obtained.

EXAMPLE 115

Seventy three parts of a dye represented by formula (44) in the free acid form:

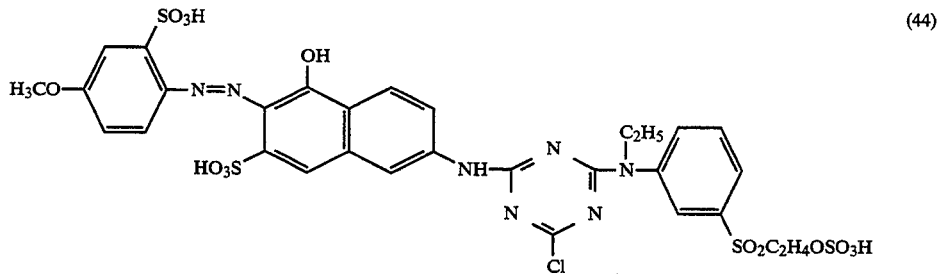

(44)

was thoroughly mixed with 0.5 part of sodium salt of polyoxyethylene substituted-phenyl ether sulfate represented by formula (4) in the free acid form, 15 parts of monomethylnaphthalenesulfonic acid-formaldehyde condensate (sodium salt), 7 parts of ε-caprolactam and 4.5 parts of anhydrous sodium sulfate.

(a) After dissolving 100 g of the dye composition thus obtained in hot water, the resulting solution was cooled to 25° C. Thereto were added 150 g of 50° Baumé sodium silicate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform, clear and deep scarlet color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, clear and deep scarlet colored dyed product was obtained.

EXAMPLE 16

Sixty parts of a dye represented by formula (45) in the free acid form:

2 parts of sodium salt of polyoxyethylene substituted-phenyl ether sulfate represented by formula (6) in the free acid form, 6 parts of monomethylnaphthalenesulfonic acid-formaldehyde condensate (sodium salt), 6 parts of dimethylnaphthalenesulfonic acid-formaldehyde condensate (sodium salt), 8 parts of ε-caprolactam, 1 part of a mineral oil emulsion and 2 parts of anhydrous sodium sulfate.

(a) After dissolving 100 g of the dye composition thus obtained in hot water, the resulting solution was cooled to 25° C. Thereto were added 30 g of anhydrous sodium sulfate and 25 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 10 hours, and then the dyed product was washed in the conventional manner to remove the unfixed dye, and then dried. The dyed product thus obtained had a spotless, uniform, clear and deep green color.

(b) The padding solution obtained in (a) was allowed to stand at 25° C. for 100 minutes. No deposition of dye was observed in the dye solution. When the solution was used for padding a woven fabric of cotton in the same manner as in (a), a uniform, clear and deep green colored dyed product was obtained.

EXAMPLE 117

Eighty parts of a dye represented by formula (47) in the free acid form:

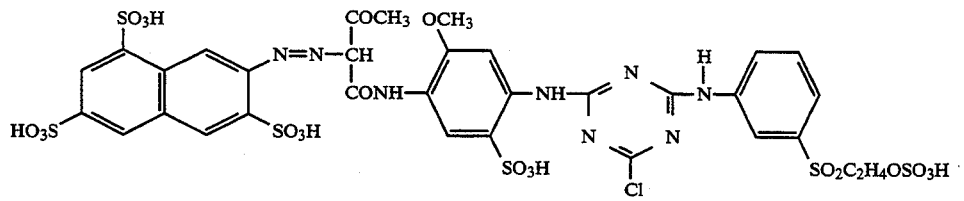

(45)

was thoroughly mixed with 15 parts of a dye represented by formula (46) in the free acid form:

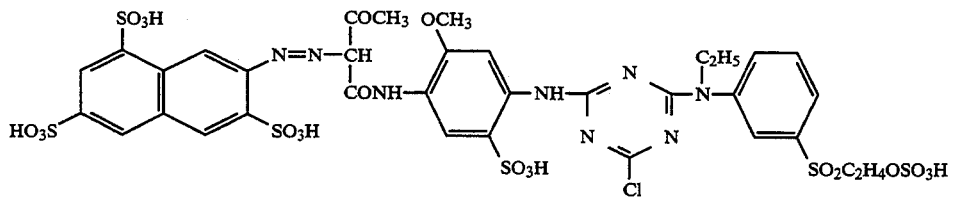

(46)

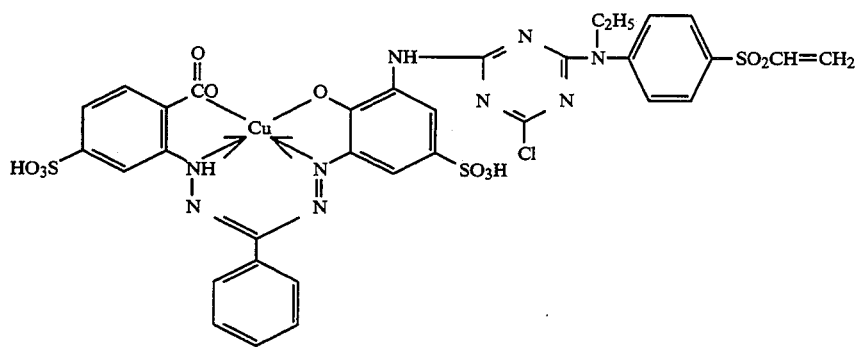
(47)

was thoroughly mixed with 0.05 part of sodium salt of polyoxyethylene substituted-phenyl ether sulfate represented by formula (2) in the free acid form, 0.05 part of sodium salt of polyoxyethylene substituted-phenyl ether sulfate represented by formula (4) in the free acid form, 10 parts of a formaldehyde condensate (sodium salt) of a mixture of 50 parts of monomethylnaphthalenesulfonic acid and 50 parts of dimethylnaphthalenesulfonic acid, 8 parts of ε-caprolactam, 1 part of a mineral oil emulsion and 0.9 part of anhydrous sodium sulfate.

(a) After dissolving 100 g of the dye composition thus obtained in hot water, the resulting solution was cooled to 25° C. Thereto were added 200 g of 50° Baumé sodium silicate, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 15 hours, and then the dyed product was washed in the conventional manner to remove the unfixed dye, and then dried. The dyed product thus obtained had a spotless, uniform and deep blue color.

(b) The padding solution obtained in (a) was allowed to stand at 25° C. for 120 minutes. No deposition of dye was observed in the dye solution. When the solution was used for padding a woven fabric of cotton in the same manner as in (a), a uniform, deep blue colored dyed product was obtained.

EXAMPLE 118

In a wince dyeing machine was set 100 kg of a knit cotton fabric. The liquor ratio was adjusted to 1:15, and the water temperature was adjusted to 50° C. Seventy parts of a dye represented by formula (48) in the free acid form:

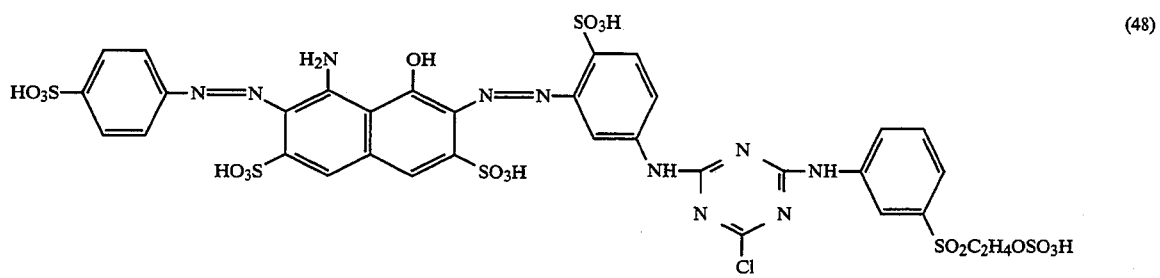
(48)

was thoroughly mixed with 0.05 part of sodium salt of polyoxyethylene substituted-phenyl ether sulfate represented by formula ( 2 ) in the free acid form, 11.95 parts of monoethylnaphthalenesulfonic acid-formaldehyde condensate ( sodium salt ), 3 parts of ε-caprolactam and 15 parts of sodium chloride. After dissolving 6 kg of the dye composition thus obtained in the conventional manner, the resultant solution was thrown into a dyeing bath and the water temperature was kept at 60° C. Then, 75 kg of anhydrous sodium sulfate was added to the dyeing bath in the conventional manner, and a knit cotton fabric was treated at that temperature for 20 minutes. After adding 30 kg of sodium carbonate to the bath in the conventional manner, the knit cotton fabric was treated at the same temperature as above for 60 minutes to complete the dyeing. The dyed product was finished by washing it in the conventional manner. The dyed product thus obtained had a spotless, uniform and deep navy blue color.

EXAMPLE 119

One hundred kilograms of a knit fabric made of rayon fiber was set in a low liquor ratio type liquid flow dyeing apparatus, and the liquor ratio was adjusted to 1:6 and the water temperature was adjusted to 70° C. Fifty parts of a dye represented by formula (49) in the free acid form:

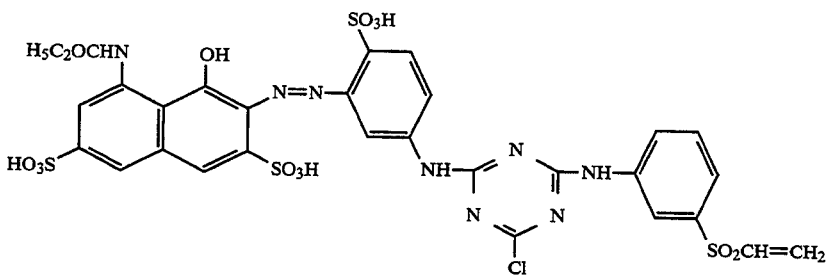

(49)

was thoroughly mixed and 25 parts of a dye represented by formula (50) in the free acid form:

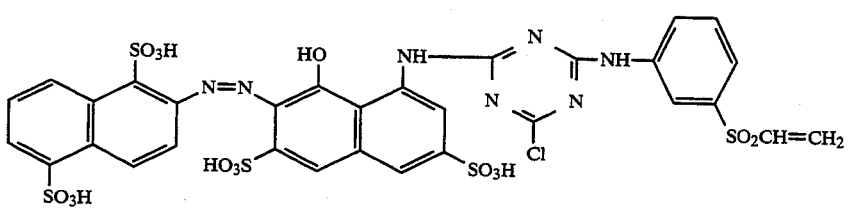

(50)

and 0.2 part of sodium salt of polyoxyethylene substituted-phenyl ether sulfate represented by formula (51) in the free acid form:

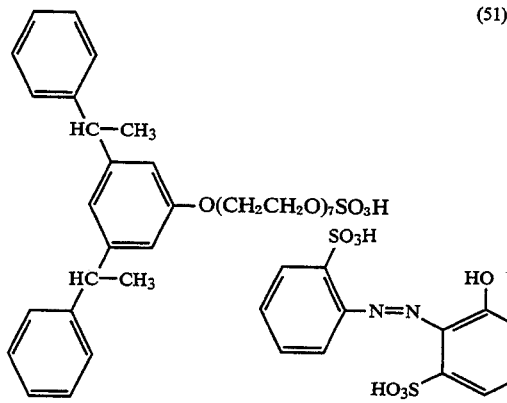

(51)

and 14.8 parts of monomethylnaphthalenesulfonic acid-formaldehyde condensate (sodium salt) and 10 parts of ε-caprolactam. After dissolving 5 kg of the dye composition thus obtained in the conventional manner, the resultant solution was thrown into a dyeing bath and the water temperature was kept at 70° C. Then, 40 kg of sodium chloride was added to the bath in the conventional manner, a knit fabric was treated at the same temperature as above for 30 minutes, and then 3 kg of sodium tertiary phosphate was added to the bath. The knit fabric was treated at the same temperature as above for 60 minutes to complete the dyeing. The dyed product was finished by washing it in the conventional manner. The dyed product obtained herein had a spotless, uniform and clear deep bluish red color.

EXAMPLE 120

One hundred kilograms of a cheese-form cotton yarn was set in a cheese dyeing apparatus, and the liquor ratio and water temperature were adjusted to 1:10 and 55° C., respectively. On the other hand, 70 parts of a dye represented by formula (52) in the free acid form:

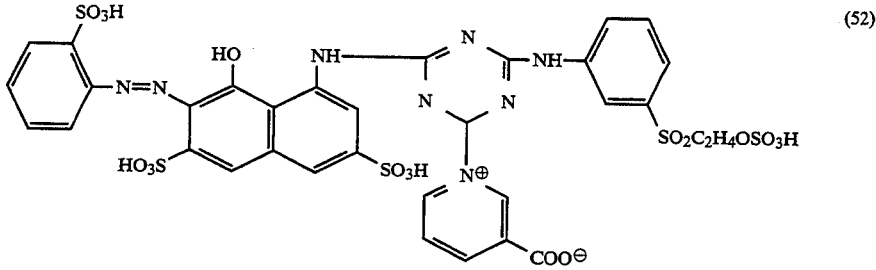

(52)

was thoroughly mixed with 0.5 part of sodium salt of polyoxyethylene substituted-phenyl ether sulfate represented by formula (53) in the free acid form:

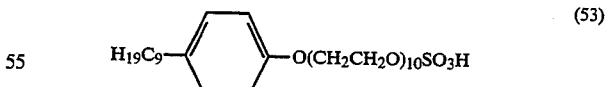

(53)

3 parts of ε-caprolactam and 16.5 parts of anhydrous sodium sulfate. After dissolving 3 kg of the dye composition thus obtained in the conventional manner, the resultant solution was thrown into a dyeing bath and the water temperature was kept at 55° C. After adding 50 kg of anhydrous sodium sulfate into the bath in the conventional manner, the yarn was treated at that temperature for 30 minutes, after which 2.5 kg Of sodium carbonate and 1 kg of sodium hydroxide were thrown into the bath and the yarn was treated at that temperature for 60 minutes to complete the dyeing. The dyed yarn was finished by washing it in the conventional manner. The dyed yarn thus obtained had a uniform, clear and deep bluish red color and showed no difference in color density between the inner and outer layers of the cheese.

EXAMPLE 121

In a high pressure liquid flow dyeing machine was set 200 kg of a union knit fabric constituted of 50 parts of a cotton fiber and 50 parts of a polyester fiber. The liquor ratio was adjusted to 1:10, the water temperature was adjusted to 80° C. and the pH was adjusted to 5 with acetic acid. Then, an aqueous dispersion in which 1.0 kg of a disperse dye represented by formula (54):

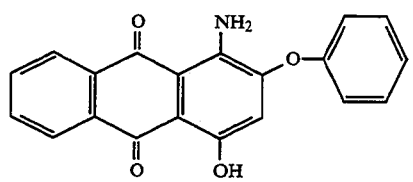
(54)

had been dispersed with 2 kg of a dispersant (Sumipon TF, manufactured by Sumitomo Chemical Co., Ltd.) was thrown into the bath. The bath temperature was elevated to 130° C. in 40 minutes, and the polyester part was dyed at this temperature for 40 minutes. Then, the dye solution was discharged, fresh water was fed, and the liquor ratio and water temperature were adjusted to 1:10 and 60° C., respectively. Then, 2.4 kg of a dye composition consisting of 80 parts of a dye represented by formula (55) in the free acid form:

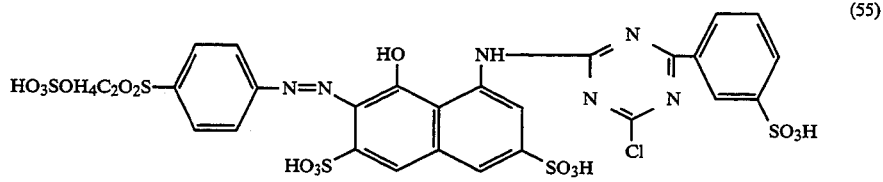
(55)

and 0.2 part of sodium salt of polyoxyethylene substituted-phenyl ether sulfate represented by formula (2) in the free acid form, 11.8 parts of monomethylnaphthalenesulfonic acid-formaldehyde condensate (sodium salt), 3 parts of ε-caprolactam and 5 parts of anhydrous sodium sulfate was dissolved in the conventional manner and thrown into the bath, and the water temperature was kept at 65° C. Then, 40 kg of anhydrous sodium sulfate was added to the bath in the conventional manner, the knit fabric was treated at this temperature for 20 minutes, 30 kg of sodium carbonate was thrown into the bath in the conventional manner, and the knit fabric was treated at the same temperature as above for 60 minutes to complete the dyeing. The dyed product was finished by washing it in the conventional manner. The dyed product obtained herein had a spotless, uniform, clear and deep bluish red color.

EXAMPLE 122

Eighty grams of the dye composition obtained in Example 114 was dissolved in hot water and cooled to 25° C. To the dye solution thus obtained were added 1 g of sodium alginate, 10 g of sodium meta-nitrobenzenesulfonate and 20 g of sodium bicarbonate. Water was added to the mixture to adjust the total volume to 1 liter at 25° C., just after which the solution thus obtained was used as a padding solution to pad a cotton woven fabric. The padded cotton woven fabric was dried at 120° C. for 2 minutes, and then steamed at 100° C. for 5 minutes to fix the dye. The dyed product was finished by washing it in the conventional manner. The dyed product thus obtained had a uniform, clear and deep bluish red color.

EXAMPLE 123

A printing paste was prepared from 80 g of the dye composition obtained in Example i14, 50 g of urea, 550 g of sodium alginate, 300 g of hot water and 20 g of sodium bicarbonate. A No. 40 mercerized broad cotton fabric was printed with the printing paste in the conventional manner and then steamed at 100° C. for 5 minutes. Then, it was washed with cold water and hot water, soaped, washed with hot water and cold water, and dried. The broad cotton cloth thus obtained had a uniform, clear and deep bluish red color.

EXAMPLE 124

One hundred kilograms of Cotton knit fabric was set in a liquid flow dyeing machine, and liquor ratio and water temperature were adjusted to 1:15 and 65° C. Into the bath were thrown 0.6 kg the dye composition obtained in Example 114, 1.5 kg the dye represented by formula (17) in the free acid form which had been dissolved previously and 1 kg of the dye represented by formula (16) in the free acid form which had been dissolved previously, in the conventional manner. Further, 75 kg of anhydrous sodium sulfate was added into the bath in two portions in the conventional manner, and then the knit fabric was treated at the same temperature as above for 20 minutes. Then, 20 kg of sodium carbonate was added into the bath in three portions in the conventional manner, and the knit fabric was treated at the same temperature as above for 60 minutes to complete the dyeing. The dyed product was finished by washing it in the conventional manner. The dyed product thus obtained had a spotless and uniform moss green color.

EXAMPLE 125

Fifty kilograms of a cheese-form cotton yarn was set in a cheese dyeing apparatus, and the liquor ratio and water temperature were adjusted to 1:10 and 65° C., respectively. After dissolving 0.5 kg of the dye composition obtained in Example 116 and 0.5 kg of Sumifix Supra Turquoise Blue BGF (manufactured by Sumitomo Chemical Co., Ltd.) in the conventional manner, the resulting solution was thrown into the bath, and the water temperature was kept at 60° C. After adding 25 kg of anhydrous sodium sulfate in the conventional manner into the bath, the yarn was treated at this temperature for 30 minutes. Then, 5 kg of sodium tertiary phosphate was added to the bath in the conventional manner, and the yarn was treated at the same temperature as above for 60 minutes to complete the dyeing. The dyed yarn was finished by washing it in the conventional manner. The dyed yarn thus obtained had a uniform and clear green color and showed no difference in color density between the inner and outer layers of the cheese.

EXAMPLES 126–131

Dye mixtures were prepared by repeating Example 114, except that the dye represented by formula (43) was replaced with each of the dyes shown in Tables 9 and 10.

(a) Using each of the dye mixtures thus obtained, dyeing was carried out in the same manner as in Example 114 (a). Hues of the dyed products thus obtained were as shown in Tables 9 and 10, and the products were all uniform in color.

(b) The padding solutions were allowed to stand in the same manner as in Example 114 (b). No deposition of dye was observed in the dye solutions, and dyed products of the hues shown in Tables 1 and 2 were obtained as in (a).

| Example No. | Dye (expressed in the free acid form) | Hue |
| --- | --- | --- |
| 126 | 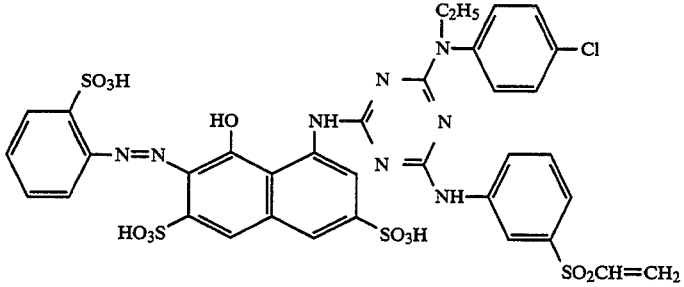 | Bluish red |
| 127 | 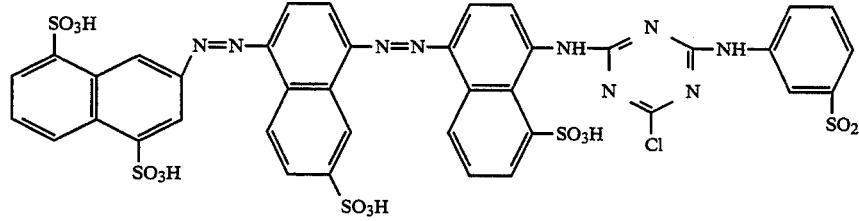 | Reddish brown |
| 128 | 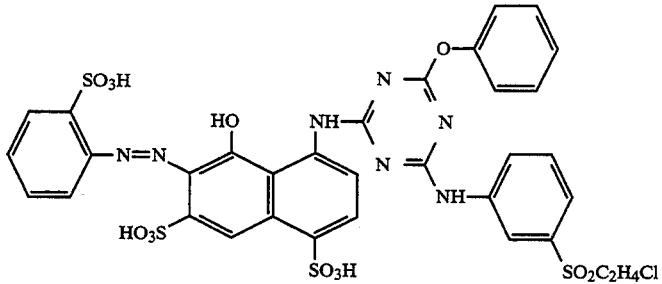 | Yellowish red |
| 129 | 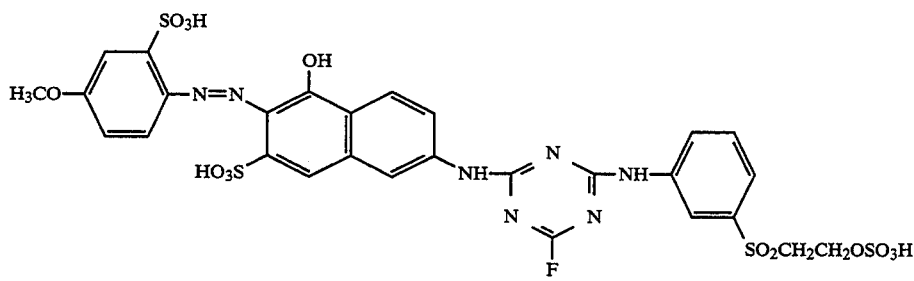 | Scarlet |
| 130 | 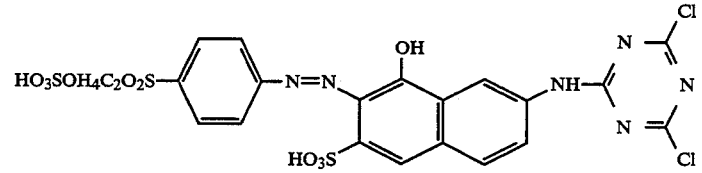 | Orange brown |

| Example No. | Dye (expressed in the free acid form) | Hue |
|---|---|---|
| 131 | ![dye structure] | Bluish red |

EXAMPLES 132–137

Dye mixtures were prepared by repeating Example 114, except that the polyoxyethylene substituted-phenyl ether sulfate salt represented by formula (2) was replaced with each of the compounds shown in Tables 11 and 12.

(a) Using each of the dye mixtures thus obtained, dyeing was carried out in the same manner as in Example 114 (a). The dyed products thus obtained all had a spotless, uniform and deep bluish red color.

(b) The padding solutions were allowed to stand in the same manner as in Example 114 (b). No deposition of dye was observed in the dye solutions, and dyed products having a uniform and deep bluish red color were obtained as in (a).

| Example No. | Salt of polyoxyethylene substituted-phenyl ether ester (expressed in the free acid form) |
|---|---|
| 132 | 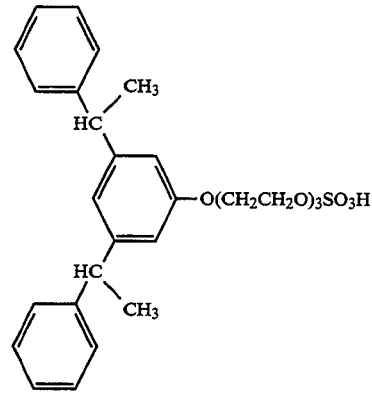 |
| 133 | 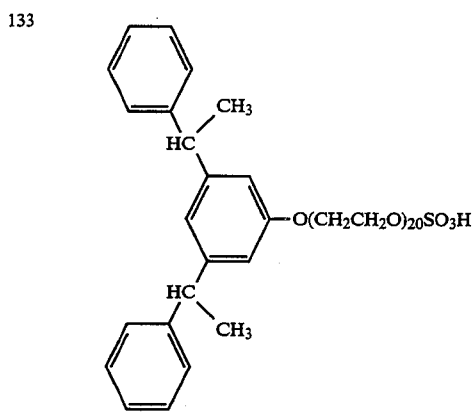 |
| 134 | $H_{17}C_8$—⟨⟩—$O(CH_2CH_2O)_{18}SO_3H$ |
| 135 | $H_{19}C_9$—⟨⟩—$O(CH_2CH_2O)_2SO_3H$ |
| 136 | $H_{19}C_9$ (3-position), —$O(CH_2CH_2O)_{20}SO_3H$ |
| 137 | $H_{13}C_6$—⟨⟩—$O(CH_2CH_2O)_{16}SO_3H$ |

EXAMPLE 138

Eighty parts of a dye represented by formula (43) in the free acid form and 4 parts of sodium salt of polyoxyethylene substituted-phenyl ether phosphate represented by formula (18) in the free acid form were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep bluish red color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep bluish red colored dyed product was obtained.

EXAMPLE 139

Eighty parts of a dye represented by formula (43) in the free acid form and 4 parts of ammonium salt of polyoxyethylene substituted-phenyl ether sulfate represented by formula (19) in the free acid form were thoroughly mixed together.

(a) After dissolving 100 g of the dye composition thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The dyed product thus obtained had a spotless, uniform and deep bluish red color.

(b) The padding solution obtained in (a) was allowed to stand at 25° C. for 60 minutes. No deposition of dye was observed in the dye solution. When the solution was used for padding a woven fabric of cotton in the same manner as in (a), a uniform and deep bluish red colored dyed product was obtained.

EXAMPLES 140–145

Eighty parts of each of the dyes shown in Tables 13 and 14 was thoroughly mixed with 4 parts of sodium salt of polyoxyethylene substituted-phenyl ether sulfate represented by formula (2) in the free acid form.

(a) After dissolving 100 g of each of the dye compositions thus obtained in hot water, the resulting solution was cooled to 25° C. Thereto were added 150 g of 50° Baumé sodium silicate and 15 ml of 32.5% caustic soda solution, immediately after which water was added to adjust the total quantity to 1 liter at 25° C. Just after it, a woven fabric of cotton was padded in the conventional manner by using the solution obtained above as a padding solution. The padded fabric was immediately wound up, tightly sealed with a polyethylene film and allowed to stand indoors at 20° C. for 20 hours, and then the dyed product was washed in the conventional manner to remove the unfixed dye, and then dried. The hues of the dyed product thus obtained were as shown in Tables 5 and 6. They were all spotless, uniform and deep-colored products.

(b) The padding solutions obtained in (a) were allowed to stand at 25° C. for 120 minutes. No deposition of dye was observed in the dye solutions. When the solutions were used for padding a woven fabric of cotton in the same manner as in (a), uniform and deep-colored dyed product were obtained.

| Example No. | Dye (expressed in the free acid form) | Hue |
|---|---|---|
| 140 | [Cu phthalocyanine complex with (SO₃H)₂.₀ and (SO₂NHC₂H₄NH-triazinyl(Cl)-NH-C₆H₄-SO₂C₂H₄OSO₃H)₂.₀ substituents] | Clear blue |
| 141 | [Bis-triazine dioxazine dye structure with SO₂C₂H₄OSO₃H and SO₃H groups] | Clear blue |
| 142 | [Bis-triazine dioxazine dye structure with SO₂C₂H₄OSO₃H, NHC₂H₄SO₃H and SO₃H groups] | Clear reddish blue |

-continued

| Example No. | Dye (expressed in the free acid form) | Hue |
|---|---|---|
| 143 | | Blue |
| 144 | | Bluish red |
| 145 | | Clear greenish yellow |

What is claimed is:

1. A reactive dye composition comprising a reactive dye and a salt of polyoxyethylene substituted-phenyl ether ester.

2. A composition according to claim 1, wherein the reactive dye has at least one reactive group selected from a vinylsulfone type reactive group, a triazine type reactive group and a pyrimidine type reactive group; the vinylsulfone type reactive group being represented by the formula —$SO_2L_1$ in which $L_1$ is —CH=$CH_2$ or —$CH_2CH_2L_2$ in which $L_2$ is a group capable of being split by the action of an alkali, the triazine type reactive group consisting of monochlorotriazinyl, monofluorotriazinyl, mononicotiniotriazinyl and dichlorotriazinyl, and the pyrimidine type reactive group consisting of difluoromonochloropyrimidinyl and trichloropyrimidinyl.

3. A composition according to claim 2, wherein the reactive dye is a phthalocyanine reactive dye represented by the formula (I) in the free acid form:

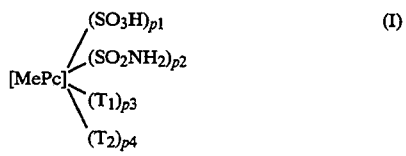

wherein [MePc] is metal phthalocyanine; $p_1$, $p_2$, $p_3$ and $p_4$ represent a number of 1 to 3, 0 to 2, 1 to 3 and 0 to 2, respectively, provided that $p_1+p_2+p_3+p_4 \leq 4$; $T_1$ and $T_2$ are different from one another, $T_1$ is a group having any one reactive group selected from the vinylsulfone type, triazine type and pyrimidine type reactive groups, and $T_2$ is a group having any one reactive group selected from the vinylsulfone type and pyrimidine type reactive groups.

4. A composition according to claim 2, wherein the reactive dye is a monoazo reactive dye represented by the formula (II) in the free acid form:

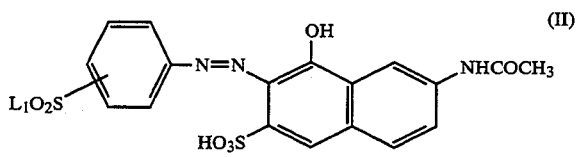

wherein $L_1$ is —CH=$CH_2$ or —$CH_2CH_2L_2$ in which $L_2$ is a group capable of being split by the action of an alkali.

5. A composition according to claim 2, wherein the reactive dye is an anthraquinone reactive dye represented by the formula (IV) in the free acid form:

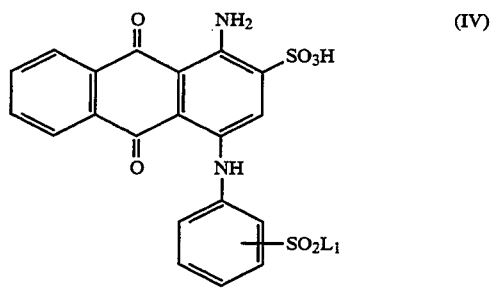

wherein $L_1$ is —CH=$CH_2$ or —$CH_2CH_2L_2$ in which $L_2$ is a group capable of being split by the action of an alkali.

6. A composition according to claim 2, wherein the reactive dye is a formazan reactive dye represented by the formula (V) in the free acid form:

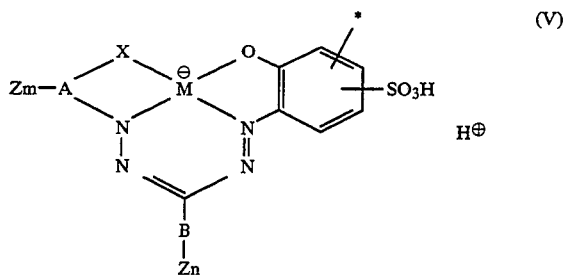

wherein A is an unsubstituted or substituted phenylene or naphthylene residue; B is a straight chain or branched chain alkyl or alkenyl group, a phenyl group, a naphthyl group or a heterocyclic group, in which the said alkyl, alkenyl, phenyl, naphthyl and heterocyclic groups are unsubstituted or substituted; M is a metallic ion having an atomic number of 27 to 29; X is —O— or —COO—; Z is a water-solubility imparting group; m and n independently represent an integer of 0 to 3, provided that m+n=1 to 3; and the asterisked bond is linked to any one reactive group selected from the vinylsulfone type, triazine type and pyrimidine type reactive groups, or alternatively, the bond is linked to a substituent having any one of the said reactive groups.

7. A composition according to claim 2, wherein the reactive dye is a dioxazine reactive dye represented by the following formula (VI) in the free acid form:

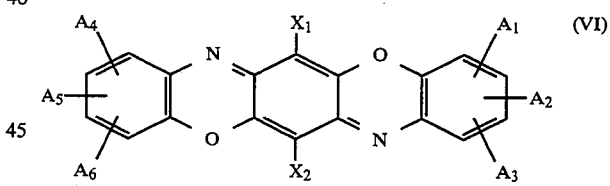

wherein $X_1$ and $X_2$ are independently hydrogen or halogen; and at least one of $A_1$, $A_2$, $A_3$, $A_4$, $A_5$ and $A_6$ represents a bond linking to any one of the vinylsulfone type, triazine type or pyrimidine type reactive group, or a bond linking to a substituent having any one of the said reactive groups, and the remaining ones are independently hydrogen, lower alkyl, lower alkoxy, sulfo or amino.

8. A composition according to claim 2, wherein the reactive dye is represented by the formula (VII) or (VIII) in the free acid form:

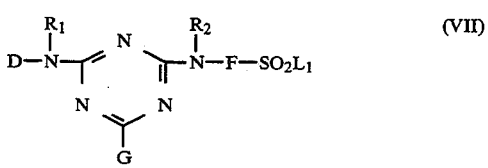

-continued

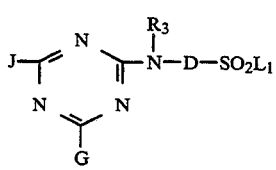 (VIII)

wherein $R_1$, $R_2$ and $R_3$ are independently hydrogen, or unsubstituted or substituted alkyl; D is a sulfo-bearing organic dye residue; F is unsubstituted or substituted phenylene or naphthylene; G and J are independently halogen, unsubstituted or substituted pyridino, —$N(R_4)R_5$, —$OR_6$ or —$SR_7$ in which $R_4$, $R_5$, $R_6$ and $R_7$ are independently hydrogen or unsubstituted or substituted alkyl, phenyl, naphthyl or benzyl; and $L_1$ is as defined in claim 2.

9. A composition according to claim 1, wherein the salt of polyoxyethylene substituted-phenyl ether ester is at least one member selected from the group consisting of sodium salt, potassium salt and ammonium salt of sulfuric ester or phosphoric ester.

10. A composition according to claim 1, wherein the salt of polyoxyethylene substituted-phenyl ether ester is represented by the formula (XX) in the free acid form:

 (XX)

wherein Q is α-methylbenzyl or phenyl substituted with $C_1$-$C_{16}$ alkyl; and q is an integer of from 1 to 20.

11. A composition according to claim 1, wherein the salt of polyoxyethylene substituted-phenyl ether ester is represented by the formula (XXI) in the free acid form:

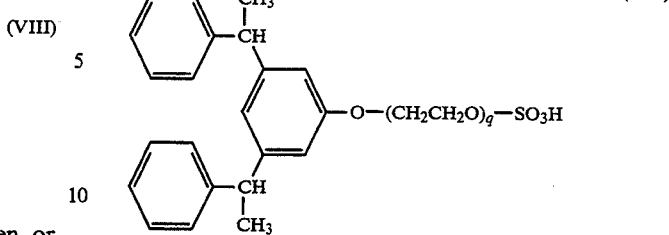 (XXI)

wherein q is an integer of from 1 to 20.

12. A composition according to claim 1, wherein the salt of polyoxyethylene substituted-phenyl ether ester is represented by the formula (XXII):

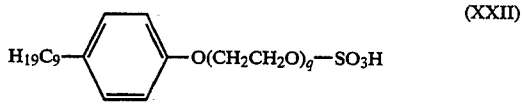 (XXII)

wherein q is an integer of from 1 to 20.

13. A composition according to claim 1, wherein the amount of the salt of polyoxyethylene substituted-phenyl ether ester is within a range of from 0.01 to 20% by weight based on the weight of the reactive dye.

14. A composition according to claim 1, wherein the reactive dye composition further comprises an alkylated or non-alkylated naphthalenesulfonic acid-formaldehyde condensate and/or ε-caprolactam.

15. A composition according to claim 14, wherein the condensate has a sulfonation degree of 50 to 150%.

16. A composition according tom claim 14, wherein the condensate has an average condensation degree of 1.1 to 3.0.

17. A composition according to claim 14, wherein the amount of the condensate is 100% by weight or less based on the weight of the reactive dye.

18. A composition according to claim 14, wherein the amount of ε-caprolactam is 30% by weight or less based on the weight of the reactive dye.

19. A composition according to claim 5, wherein the reactive dye composition further comprises an alkylated or non-alkylated naphthalenesulfonic acid-formaldehyde condensate and ε-caprolactam.

20. A method for dyeing or printing a fiber material which comprises using a composition according to claim 1.

21. A method for increasing the solubility of a reactive dye in water and in an aqueous alkali solution which comprises mixing a salt of polyoxyethylene substituted-phenyl ether ester with a reactive dye.

* * * * *